(12) United States Patent
Noh et al.

(10) Patent No.: US 12,082,306 B2
(45) Date of Patent: Sep. 3, 2024

(54) METHOD AND APPARATUS FOR PERFORMING COOPERATIVE COMMUNICATION IN WIRELESS COMMUNICATION SYSTEM

(71) Applicant: SAMSUNG ELECTRONICS CO., LTD., Suwon-si (KR)

(72) Inventors: Hoondong Noh, Suwon-si (KR);
Euichang Jung, Suwon-si (KR);
Jinhyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/152,644

(22) Filed: Jan. 10, 2023

(65) Prior Publication Data

US 2023/0254939 A1  Aug. 10, 2023

Related U.S. Application Data

(63) Continuation of application No. 16/925,210, filed on Jul. 9, 2020, now Pat. No. 11,553,557.

(30) Foreign Application Priority Data

Jul. 11, 2019 (KR) .................. 10-2019-0083952
Apr. 24, 2020 (KR) .................. 10-2020-0050319

(51) Int. Cl.
*H04W 72/04* (2023.01)
*H04L 5/00* (2006.01)
(Continued)

(52) U.S. Cl.
CPC ........... *H04W 80/02* (2013.01); *H04L 5/0048* (2013.01); *H04L 5/10* (2013.01); *H04W 8/24* (2013.01);
(Continued)

(58) Field of Classification Search
CPC ....... H04W 80/02; H04W 8/24; H04W 76/27; H04W 72/0453; H04W 72/0446;
(Continued)

(56) References Cited

U.S. PATENT DOCUMENTS

| 10,863,494 B2 | 12/2020 | Zhang et al. | |
| 2013/0170435 A1* | 7/2013 | Dinan | H04W 40/02 |
| | | | 370/328 |

(Continued)

FOREIGN PATENT DOCUMENTS

| EP | 3509383 A1 | 7/2019 |
| WO | 2019032020 A1 | 2/2019 |

OTHER PUBLICATIONS

ZTE, "Enhancements on multi-TRP/Panel transmission", 3GPP TSG RAN WG1 Ad-Hoc Meeting 1901, Jan. 21-25, 2019, R1-1900087, 16 pages.

(Continued)

*Primary Examiner* — Wei Zhao

(57) ABSTRACT

In a wireless communication system, a user equipment (UE) transmits, to a base station (BS), UE capability information comprising whether the UE supports cooperative communication for receiving physical downlink shared channels (PDSCHs) from a plurality of transmission reception points (TRPs) in a particular time-frequency resource, obtains, via radio resource control (RRC), information about whether the cooperative communication is to be applied from the BS, identifies a format of a medium access control (MAC) control element (CE) received from the BS based on whether the BS is to apply the cooperative communication, and determines transmission configuration indication (TCI) states according to the respective TRPs, based on the identified format of the MAC CE.

16 Claims, 24 Drawing Sheets

(51) Int. Cl.
  *H04L 5/10* (2006.01)
  *H04W 8/24* (2009.01)
  *H04W 72/0446* (2023.01)
  *H04W 72/0453* (2023.01)
  *H04W 72/23* (2023.01)
  *H04W 76/27* (2018.01)
  *H04W 80/02* (2009.01)

(52) U.S. Cl.
  CPC ... *H04W 72/0446* (2013.01); *H04W 72/0453* (2013.01); *H04W 72/23* (2023.01); *H04W 76/27* (2018.02)

(58) Field of Classification Search
  CPC .... H04W 72/042; H04W 72/045; H04L 5/10; H04L 5/0048
  See application file for complete search history.

(56) References Cited

U.S. PATENT DOCUMENTS

| | | | |
|---|---|---|---|
| 2013/0294318 | A1 | 11/2013 | Amerga et al. |
| 2021/0168779 | A1 | 6/2021 | Mondal et al. |
| 2021/0259000 | A1* | 8/2021 | Khoshnevisan ...... H04L 5/0048 |
| 2021/0391899 | A1* | 12/2021 | Cao ...................... H04B 17/373 |

OTHER PUBLICATIONS

ZTE, Sanechips, "Consideration on Enhancement of TCI-State MAC CE for Multi-TRP transmission", 3GPP TSG-RAN WG2 Meeting #105bis, Apr. 8-12, 2019, R2-1904136, 7 pages.

Samsung, "MAC CE design for support of multiple beam indication for multiple TRPs", Change Request, 3GPP TSG-RAN WG2 Meeting #106, May 13-17, 2019, R2-1907715, 7 pages.

Notification of Transmittal of the International Search Report and the Written Opinion of the International Searching Authority, or the Declaration dated Oct. 13, 2020 in connection with International Patent Application No. PCT/KR2020/009014, 11 pages.

European Patent Office, "Supplementary European Search Report," dated Sep. 15, 2022, in connection with European Patent Application No. 20836040.4, 14 pages.

Samsung: "Support of Multiple Beam Indication for Multiple TRPs",3GPP TSG-RAN WG2 Meeting #106, R2-1907714 (Revision of R2-1904729), 4 pages.

Samsung: "MAC CE design for support of multiple beam indication for multiple TRPs", 3GPP TSG-RAN2 Meeting #105bis, R2-1904756, 7 pages.

VIVO: "Email discussion summary on eMIMO MAC CE", 3GPP TSG-RAN WG2 Meeting #108, R2-1914710, 16 pages.

\* cited by examiner

FIG. 13

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

FIG. 15A

| R | Serving Cell ID | | | | | | BWP ID | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |
| R | TCI state $ID_1$ from TRP1 (for $1^{st}$ code point) | | | | | | | Oct N+1 |
| R | TCI state $ID_1$ from TRP2 (for $1^{st}$ code point) | | | | | | | Oct N+2 |

...

| R | TCI state $ID_N$ from TRP1 (for $16^{th}$ code point) | | | | | | | Oct N+31 |
| R | TCI state $ID_N$ from TRP2 (for $16^{th}$ code point) | | | | | | | Oct N+32 |

FIG. 15B

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |
|---|---|---|---|---|---|---|---|---|
| R | TCI state $ID_1$ from TRP2 (for $1^{st}$ code point) | | | | | | | |
| R | TCI state $ID_2$ from TRP2 (for $2^{nd}$ code point) | | | | | | | |

...

| R | TCI state $ID_{16}$ from TRP2 (for $16^{th}$ code point) |

FIG. 16B

| CORESET Pool ID | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

⋮

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

FIG. 16C

| R | Serving Cell ID | BWP ID | Oct 1 |
|---|---|---|---|
| $C_0$ | TCI State $ID_{0,1}$ | | Oct 2 |
| R | TCI State $ID_{0,2}$ | | Oct 3 (Optional) |

⋮

| $C_N$ | TCI State $ID_{N,1}$ | Oct M-1 |
|---|---|---|
| R | TCI State $ID_{N,2}$ | Oct M (Optional) |

METHOD AND APPARATUS FOR PERFORMING COOPERATIVE COMMUNICATION IN WIRELESS COMMUNICATION SYSTEM

CROSS-REFERENCE TO RELATED APPLICATIONS

This application is a continuation of U.S. application Ser. No. 16/925,210 filed Jul. 9, 2020, now U.S. Pat. No. 11,553,557 issued Jan. 10, 2023, which is based on and claims priority under 35 U.S.C. § 119 to Korean Patent Application No. 10-2019-0083952 filed on Jul. 11, 2019, and Korean Patent Application No. 10-2020-0050319 filed on Apr. 24, 2020 in the Korean Intellectual Property Office, the disclosures of which are herein incorporated by reference in their entirety.

BACKGROUND

1. Field

The disclosure relates to a method and apparatus for performing communication in a wireless communication system, and more particularly, to a method and apparatus for performing cooperative communication.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called "beyond 4G network" communication systems or "post long term evolution (post-LTE)" systems. To achieve high data rates, implementation of 5G communication systems in an ultra-high frequency or millimeter-wave (mmWave) band (e.g., a 60-gigahertz (GHz) band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of cloud radio access network (cloud-RAN) as the above-described big data processing technology may be an example of convergence of 5G communication technology and IoT technology.

Due to development in a wireless communication system, methods of transmitting and receiving data for network cooperative communication are being required.

SUMMARY

Based on the discussions described above, the disclosure provides a method and apparatus for transmitting and receiving signals between a transmission node and a user equipment (UE) so as to perform cooperative communication in a wireless communication system.

Additional aspects will be set forth in part in the description which follows and, in part, will be apparent from the description, or may be learned by practice of the presented embodiments of the disclosure.

According to an embodiment of the disclosure, a base station (BS) in a wireless communication system may transmit at least one medium access control (MAC) control element (CE) and downlink control information (DCI) for allocating a plurality of physical downlink shared channels (PDSCHs) to a plurality of UEs so as to support joint transmission (JT).

According to an embodiment of the disclosure, a method, performed by a UE, of performing communication in a wireless communication system may include: transmitting, to a BS, UE capability information including whether the UE supports cooperative communication for receiving PDSCHs from a plurality of transmission reception points (TRPs) in a particular time-frequency resource; obtaining, via radio resource control (RRC), information about whether the cooperative communication is to be applied from the BS; identifying a format of a MAC CE received from the BS based on whether the BS is to apply the cooperative communication; and determining transmission configuration indication (TCI) states according to the respective TRPs, based on the identified format of the MAC CE.

The determining of the TCI states may include, when the cooperative communication is applied from the BS, identifying, from the MAC CE, information about a plurality of TCI code identifiers (LDs) to be activated at a first TRP and TCI states of a second TRP, the TCI states being activated in association with the plurality of TCI code IDs, respectively.

The method may further include, as a result of the identifying of the format of the MAC CE, when one activated TCI state is mapped to code point of one TCI field, receiving a PDSCH via the particular time-frequency resource.

The MAC CE may have a structure in which pairs are arrayed, each of the pairs including a TCI code ID to be activated and an additional TCI state associated with the TCI code ID.

The MAC CE may carry information about a group of pairs of first TCI states and second TCI states, and may have a structure in which a plurality of pieces of information about a plurality of TCI code IDs corresponding to the first TCI states are sequentially arrayed, and then a plurality of pieces of information about a plurality of TCI states corresponding to the second TCI states are sequentially arrayed.

The MAC CE may have a structure in which a plurality of pieces of information about a plurality of TCI states corresponding to first TCI states are arrayed, and a plurality of pieces of information about a plurality of TCI state IDs corresponding to second TCI states are arrayed.

The MAC CE may include codeword indicating a pair of a plurality of activated TCI states.

The method may further include updating a direction of a beam for a physical downlink control channel (PDCCH) or a PDSCH, based on the pair of the plurality of activated TCI states according to the respective TRPs, the pair being included in the MAC CE.

The method may further include: receiving downlink control information (DCI); and determining a demodulation reference signal (DMRS) port for the cooperative communication, based on a preset field in the received DCI, when the UE determines that the cooperative communication is activated by the BS.

The method may further include: identifying a field including information about DMRS ports for the cooperative communication, based on a preset field in the DCI received from the BS, when the UE determines that the cooperative communication is activated by the BS; and determining a DMRS port for the cooperative communication, based on a value included in the identified field.

The method may further include, when the cooperative communication is applied, receiving a MAC CE where a plurality of pieces of TCI state information are associated with one TCI code point, and when the cooperative communication is not applied, receiving a MAC CE where one piece of TCI state information is associated with one TCI code point. The determining of the TCI states may include, when the cooperative communication is applied, identifying a plurality of TCI states associated with one TCI code point, and when the cooperative communication is not applied, identifying only one of the plurality of TCI states associated with one TCI code point.

According to an embodiment of the disclosure, a method, performed by a BS, of performing communication in a wireless communication system may include: receiving, from a UE, UE capability information including whether the UE supports cooperative communication for receiving PDSCHs from a plurality of TRPs in a particular time-frequency resource; in response to the UE supporting cooperative communication, transmitting, to the UE, information about whether the cooperative communication is to be applied from the BS, via RRC; and transmitting a MAC CE including information about TC states according to the respective TRPs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates a structure of a medium access control (MAC) control element (CE) message for indication of TCI states;

FIG. 15A illustrates a structure of a MAC CE message for C-JT/NC-JT transmission according to an embodiment of the disclosure;

FIG. 15B illustrates a structure of a MAC CE message for C-JT/NC-JT transmission according to another embodiment of the disclosure;

FIG. 16B illustrates a structure of a MAC CE message for multi-DCI based multi-TRP transmission according to an embodiment of the disclosure;

FIG. 16C illustrates a structure of a MAC CE message for single-DCI based multi-TRP transmission according to an embodiment of the disclosure;

DETAILED DESCRIPTION

Figure 1:
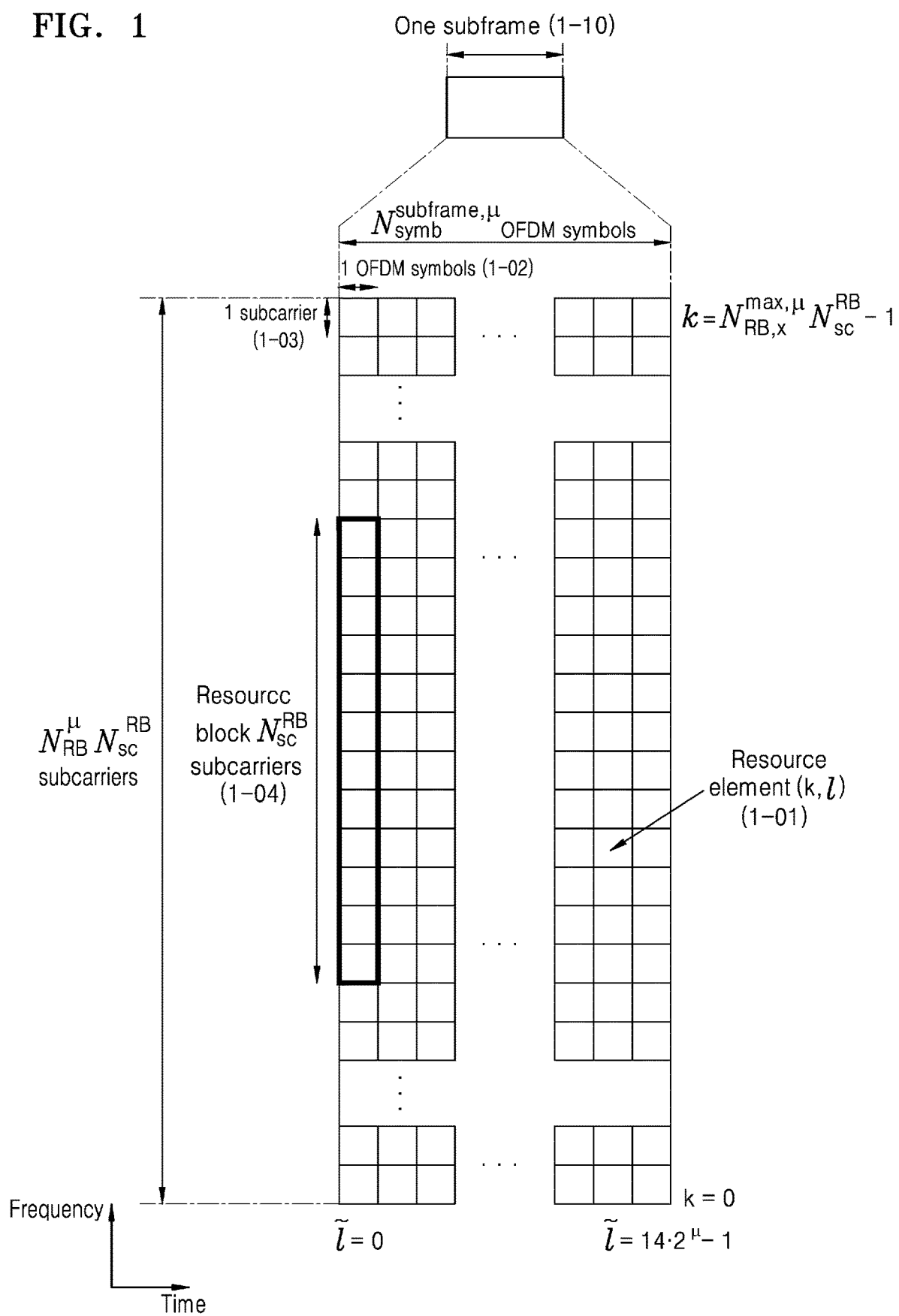
FIG. 1 illustrates a basic structure of a time-frequency domain that is a radio resource domain in which data or a control channel is transmitted in a $5^{th}$ generation (5G) system.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the attached drawings.

When describing the embodiments, descriptions about technologies that are well known in the art to which the disclosure belongs and are not directly related to the disclosure are not provided here. By not providing unnecessary descriptions, the concept of the disclosure can be further clearly provided without obscuring it.

For the same reasons, in the attached drawings, some elements may be exaggerated, omitted, or roughly illustrated. Also, the size of each element does not exactly correspond to an actual size of each element. Like reference numerals in the drawings denote like or corresponding elements.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein: rather these embodiments are provided so that this disclosure will be thorough and complete, and will fully convey the scope of the disclosure only defined by the claims to one of ordinary skill in the art. Throughout the specification, the same elements are denoted by the same reference numerals.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit," as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Therefore, according to some embodiments of the disclosure, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units." Further, the components and "units" may be implemented to operate one or more central processing units (CPUs) in a device or a secure multimedia card.

Also, according to some embodiments of the disclosure, a "unit" may include one or more processors.

Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure and can be changed according to the intent or commonly used methods of users or operators. Accordingly, definitions of the terms are understood based on the entire descriptions of the present specification. In the following description, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. Herein, an uplink (UL) refers to a radio link from a UE to an eNB. However, the disclosure is not limited to the aforementioned examples. Hereinafter, the disclosure relates to a technology by which a UE may receive broadcasting information from a BS in a wireless communication system. The disclosure relates to a communication technique and system therefor to combine a $5^{th}$ generation (5G) communication system with an Internet of Things (IoT) technology, the 5G communication system supporting data rates higher than those of a post $4^{th}$ generation (4G) system. The disclosure is applicable to intelligent services (e.g., smart home, smart building, smart city, smart car or connected car, health care, digital education, retail, security, and safety services) based on 5G communication technology and Internet of things (IoT) technology.

In the following descriptions, terms referring to broadcast information, terms referring to control information, terms related to communication coverage, terms referring to state changes (e.g., events), terms referring to network entities, terms referring to messages, terms referring to components of an apparatus, and the like are illustrated for convenience of descriptions. Accordingly, the disclosure is not limited to terms to be described below, and other terms indicating objects having equal technical meanings may be used.

For convenience of description, the disclosure uses some of terms and names defined in the $3^{rd}$ generation partnership project (3GPP) long term evolution (LTE) standards. However, the disclosure is not limited to these terms and names and may be equally applied to communication systems conforming to other standards.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-pro of the 3GPP, high rate packet data (HRPD) and ultra mobile broadband (UMB) of 3GPP2, 802.16e of the institute of electrical and electronic engineers (IEEE), or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an UL. The UL refers to a radio link through which a UE (also referred to as a mobile station (MS)) transmits data or a control signal to a BS (e.g., eNB), and the DL refers to a radio link through which a BS transmits data or a control signal to a UE. The above-described multiconnection scheme distinguishes between data or control information of different users by assigning time-frequency resources for the data or control information of the users not to overlap each other, i.e., to achieve orthogonality therebetween.

Post-LTE systems, that is, 5G systems need to simultaneously support services capable of reflecting and satisfying various requirements of users, service providers, etc. Services considered for the 5G systems include enhanced mobile broadband (eMBB), massive machine-type communication (mMTC), ultra-reliability low-latency communication (URLLC) services or the like.

According to some embodiments of the disclosure, the eMBB service may be aimed to provide a more enhanced data rate compared to a data rate supported by LTE, LTE-A, or LTE-Pro. For example, the eMBB service in the 5G communication systems need to provide a peak data rate of 20 gigabits per second (Gbps) for a DL and provide a peak data rate of 10 Gbps for a UL in view of a single base station. Simultaneously, the 5G communication is required to provide an increased user-perceived data rate of a UE. To satisfy these requirements, the 5G communication systems requires various enhanced transmission/reception technologies including enhanced multiple-input and multiple-output (MIMO). The data rate required for the 5G communication systems may be satisfied by using a frequency bandwidth wider than 20 megahertz (MHz) in a frequency band of 3 to 6 GHz or over 6 GHz compared to LTE systems currently using a transmission bandwidth in a 2 GHz band.

At the same time, the mMTC service is considered for the 5G communication systems to support application services such as IoT. The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/km$^2$). In addition, because UEs supporting mMTC may be located in a shadow zone, e.g., a basement of a building, due to service characteristics, the mMTC service may require a wider coverage compared to other services provided by the 5G communication systems. The UEs supporting mMTC need to be low-priced and are not able to frequently replace batteries and thus require a very long battery life-time, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, etc., and URLLC communication may have to provide a very low latency (e.g., ultra-low latency) and a very high reliability (e.g., ultra-reliability). For example, the URLLC service needs to satisfy an air interface latency smaller than 0.5 millisecond (ms) and, at the same time, may require a packet error rate equal to or smaller than $10^5$. Therefore, for the URLLC service, the 5G communication systems need to provide a smaller transmit time interval (TTI) compared to other services and, at the same time, may be required to broadly allocate resources in a frequency band. However, mMTC, URLLC, and eMBB described above are only examples of different service types, and thus service types to which embodiments of the disclosure are applied are not limited thereto.

The above-described services considered in the 5G communication systems should be provided in a converged manner based on one framework. That is, for efficient resource management and control, respective services may be integrated, controlled, and transmitted as one system rather than the services operate independently.

Also, although embodiments of the disclosure will be described below by using an LTE, LTE-A, LTE Pro, or NR system as an example, the embodiments of the disclosure may also be applied to other communication systems having similar technical backgrounds or channel forms. Also, the embodiments of the disclosure may also be applied to other communication systems through some modifications without departing from the scope of the disclosure by the judgment of those of ordinary skill in the art.

The disclosure relates to a method and apparatus for repeatedly transmitting data and a control signal between a plurality of transmission nodes and a UE that perform cooperative communication to increase reliability of communication.

According to an embodiment of the disclosure, in a case where network cooperative communication is used in a wireless communication system, reliability of data and a control signal which are received by the UE may be increased.

Hereinafter, a structure of a framework of the 5G system will be described in detail with reference to drawing. FIG. 1 illustrates a time-frequency domain transmission structure of a wireless communication system including an LTE, LTE-A, NR, or similar system.

FIG. 1 illustrates a basic structure of a time-frequency domain that is a radio resource domain in which data or a control channel is transmitted in the 5G system.

Referring to FIG. 1, a horizontal axis in FIG. 1 represents a time domain and a vertical axis in FIG. 1 represents a frequency domain. A basic unit of a resource in the time-frequency domain is a resource element (RE) 1-01. The RE 1-01 may be defined as one OFDM symbol 1-02 on the time axis and one subcarrier 1-03 on the frequency axis. In the frequency domain, $N_{sc}^{RB}$ (e.g., 12) successive REs may constitute one resource block (RB) 1-04.

Figure 2:
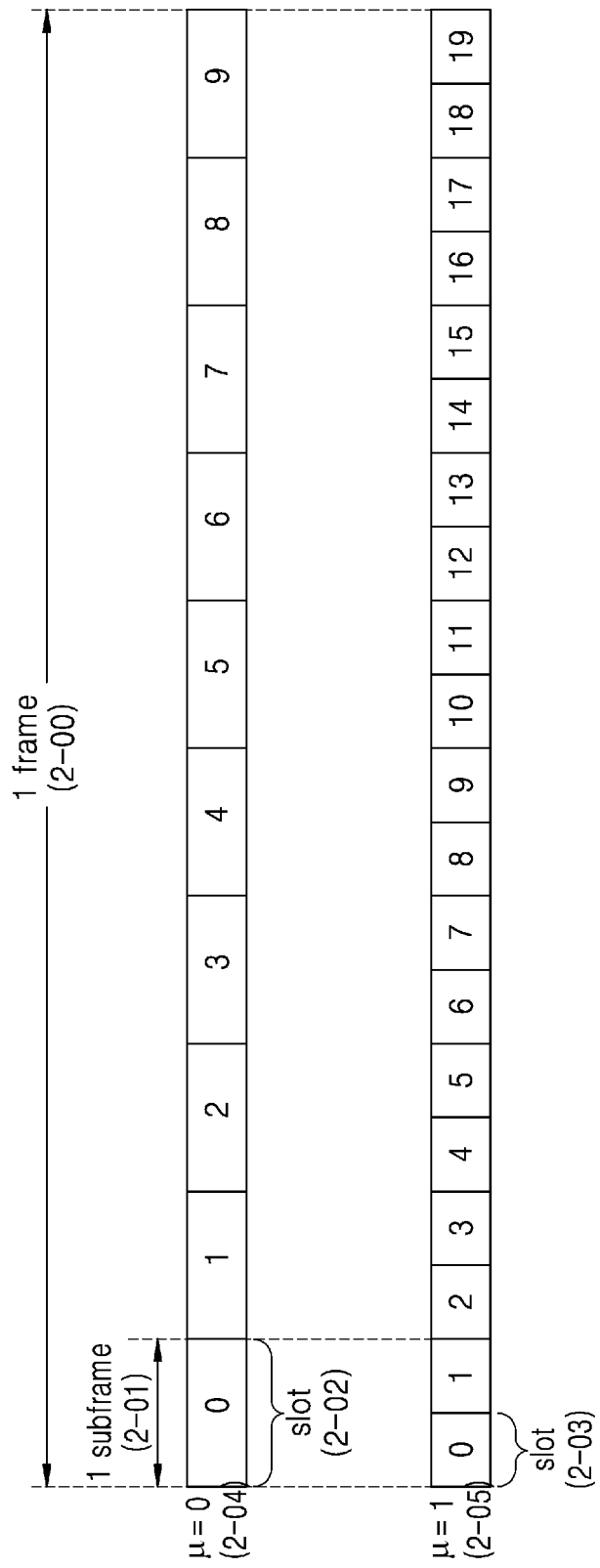
FIG. 2 illustrates structures of a frame, a subframe, and a slot in the 5G system.

FIG. 2 illustrates structures of a frame, a subframe, and a slot in the 5G system.

Referring to FIG. 2, an example of structures of a frame 2-00, a subframe 2-01, and a slot 2-02 is illustrated in FIG. 2. The frame 2-00 may be defined to be 10 ms. One subframe 2-01 may be defined to be 1 ms, and one frame 2-00 may include 10 subframes 2-01. One slot 2-02 or 2-03 may be defined to be 14 OFDM symbols (i.e., the number of symbols per one slot ($N_{symb}^{slot}$)=14). One subframe 2-01 may include one or more slots 2-02 or 2-03, and the number of slots 2-02 or 2-03 per one subframe 2-01 may vary according to a subcarrier spacing configuration value p 2-04 or 2-05.

FIG. 2 illustrates an example in which a subcarrier spacing configuration value is μ=0 2-04 and μ=1 2-05. When μ=0 2-04, one subframe 2-01 may include one slot 2-02, and when μ=1 2-05, one subframe 2-01 may include two slots 2-03. That is, the number of slots per one subframe $N_{slot}^{subframe,\mu}$ may vary according to a subcarrier spacing configuration value p, such that the number of slots per one frame $N_{slot}^{frame,\mu}$ may vary. $N_{slot}^{subframe,\mu}$ and $N_{slot}^{frame,\mu}$ according to each subcarrier spacing configuration value μ may be defined as [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In new radio (NR), one component carrier (CC) or one serving cell may include maximally at least 250 RBs. Accordingly, in a case where a UE always receives an entire serving cell bandwidth as in LTE, power consumption in the UE may be severe, and to solve this issue, a BS may configure one or more bandwidth parts (BWPs) to the UE so as to allow the UE to change a reception area in a cell.

In the NR, the BS may configure an initial BWP that is a bandwidth of control resource set (CORESET) #0 (or a common search space (CSS)) to the UE via a master information block (MIB). Afterward, the BS may configure a first BWP for the UE via radio resource control (RRC) signaling, and may notify, via downlink control information (DCI), one or more pieces of BWP configuration information that may be indicated. Afterward, the BS may indicate which bandwidth the UE is to use, by notifying an identifier (ID) of a BWP via DCI. In a case where the UE cannot receive DCI in a current allocated BWP for a particular time period, the UE may restore a default BWP and then may attempt to receive the DCI.

Figure 3:
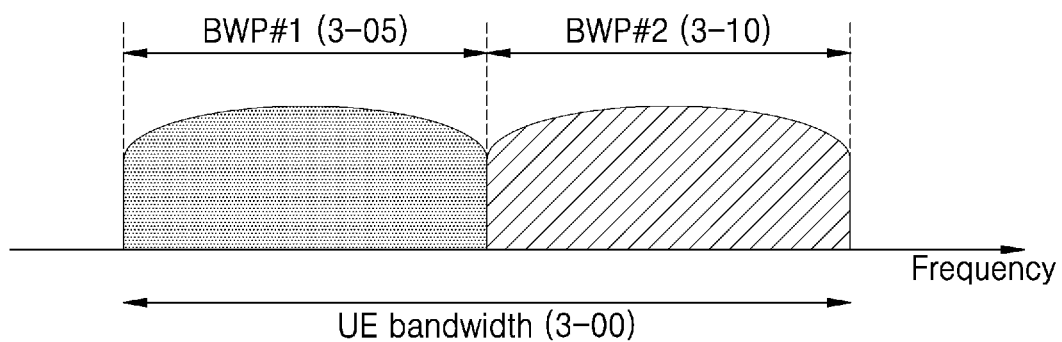
FIG. 3 illustrates a configuration of a bandwidth part (BWP) in a wireless communication system according to an embodiment of the disclosure.

FIG. 3 illustrates a configuration of a BWP in a wireless communication system according to an embodiment of the disclosure.

Referring to FIG. 3, a UE BWP 3-00 may include two BWPs that are a BWP #1 3-05 and a BWP #2 3-10. A BS may configure one BWP or a plurality of BWPs for a UE and may configure a plurality of pieces of information as in [Table 2] with respect to each BWP.

TABLE 2

| | |
|---|---|
| Configuration information 1 | Bandwidth of BWP (number of PRBs constituting BWP) |
| Configuration information 2 | Frequency location of BWP (including offset value compared with reference point, wherein the reference point may include center frequency of subcarrier, synchronization signal, synchronization signal raster, etc.) |
| Configuration information 3 | Numerology of BWP (e.g., subcarrier spacing, cyclic prefix (CP) length, etc.) |
| Others | |

In addition to configuration information described with reference to [Table 2], various parameters related to each BWP may be configured for the UE. The aforementioned information may be transferred from the BS to the UE via higher layer signaling, e.g., RRC signaling. At least one BWP from among one or more configured BWPs may be activated. Whether to activate a configured BWP may be semi-statically transferred from the BS to the UE via RRC signaling, or may be dynamically transferred from the BS to the UE via a medium access control (MAC) control element (CE) or DCI.

The aforementioned configurations with respect to a BWP which are supported by the 5G communication system may be used for various purposes.

For example, in a case where a bandwidth supported by the UE is smaller than a system bandwidth, the bandwidth supported by the UE may be supported via configuration with respect to a BWP. For example, a frequency location of a BWP (configuration information 2) in [Table 2] is configured for the UE, such that the UE may transmit or receive data at a particular frequency location in the system bandwidth.

As another example, in order to support different numerologies, the BS may configure a plurality of BWPs for the UE. For example, in order to support a random UE for data transmission and reception using both subcarrier spacing of 15 kHz and subcarrier spacing of 30 kHz, two BWPs may be configured to use subcarrier spacing of 15 kHz and subcarrier spacing of 30 kHz, respectively. Different BWPs may be frequency division multiplexed, and in order to transmit or receive data by using particular subcarrier spacing, a BWP configured with the particular subcarrier spacing may be activated.

As another example, in order to decrease power consumption in the UE, the BS may configure BWPs having different sizes for the UE. For example, in a case where the UE supports a very large bandwidth, e.g., a bandwidth of 100 MHz, and always transmits or receives data via the bandwidth, the transmission or reception may cause severe power consumption in the UE. In particular, when the UE performs monitoring on an unnecessary DL control channel of the bandwidth of 100 MHz even when there is no traffic, the monitoring is very inefficient in terms of power consumption. Therefore, in order to decrease power consumption in the UE, the BS may configure, for the UE, a BWP of a relatively small bandwidth, e.g., a BWP of 20 MHz. In a situation without traffic, the UE may perform a monitoring operation on the BWP of 20 MHz, and when data to be transmitted or received occurs, the UE may transmit or receive the data by using a BWP of 100 MHz, in response to indication by the BS.

Figure 4:
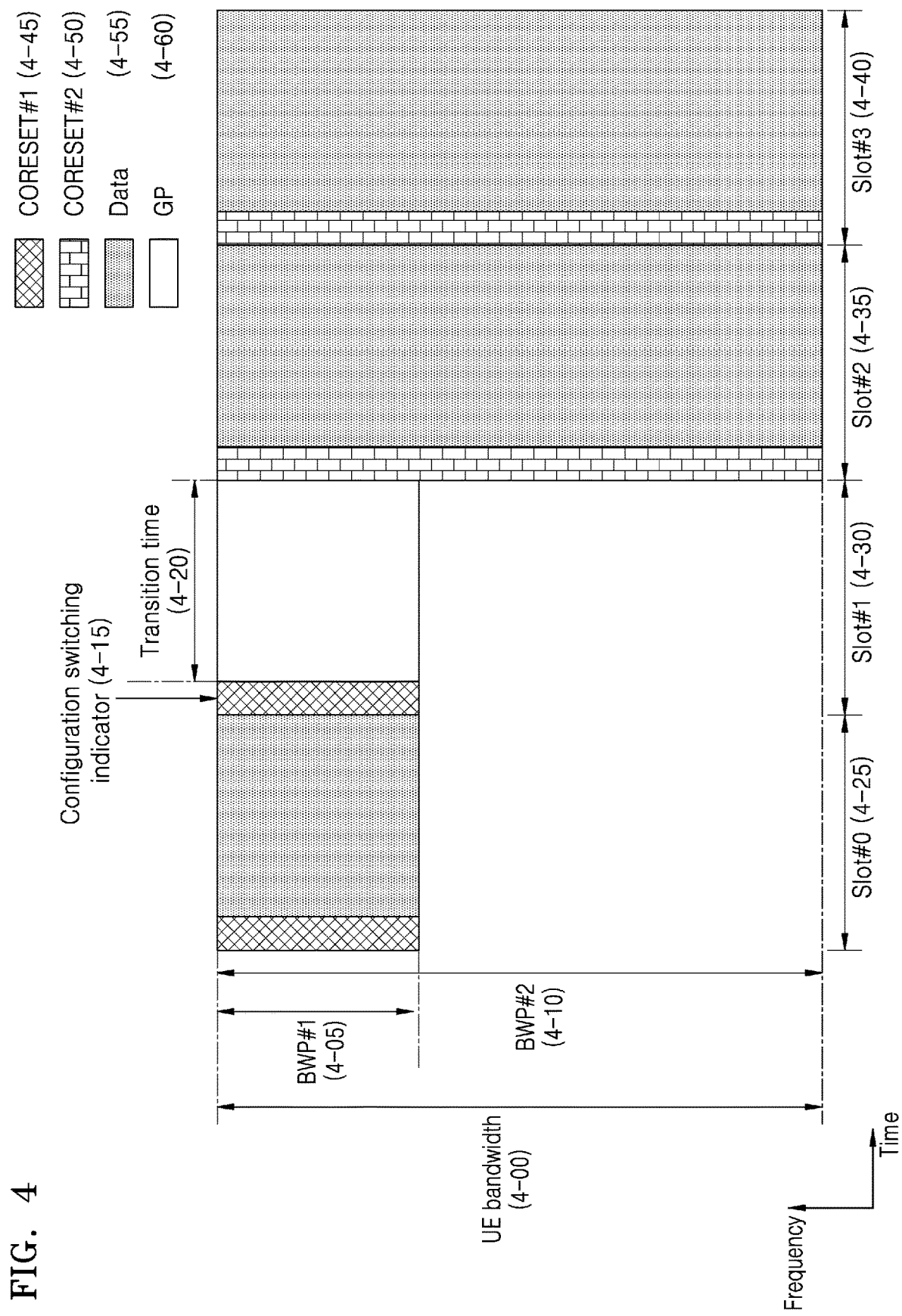
FIG. 4 illustrates a method of dynamically changing a configuration of a BWP according to an embodiment of the disclosure.

FIG. 4 illustrates a method of dynamically changing a configuration of a BWP according to an embodiment of the disclosure.

Referring to FIG. 4, as described above with reference to [Table 2], a BS may configure one BWP or a plurality of BWPs for a UE, and may indicate, as a configuration of each BWP, information about a bandwidth of each BWP, a frequency location of each BWP, and numerology of each BWP to a UE. As shown in FIG. 4, the UE may be configured with two BWPs in a UE BWP 4-00, the two BWPs including a BPW #1 4-05 and a BWP #2 4-10. One or more BWPs from among configured BWPs may be activated, and with reference to FIG. 4, an example in which one BWP is activated may be considered. A BWP #1 4-02 from among configured BWPs is activated in a slot #0 4-25, and the UE may monitor a Physical Downlink Control Channel (PDCCH) in CORESET #1 4-45 configured in the BPW #1 4-05 and may transmit or receive data 4-55 in the BPW #1 4-05. According to which BWP is activated from among the configured BWP, a CORESET in which the UE receives a PDCCH may vary, and thus a bandwidth in which the UE monitors the PDCCH may vary.

The BS may additionally transmit an indicator to switch a configuration of a BWP to the UE. In this regard, the switching of the configuration of a BWP may be equally regarded as an operation of activating a particular BWP (e.g., activation is switched from BWP A to BWP B). The BS may transmit, to the UE, a configuration switching indicator in a particular slot. The UE may receive the configuration switching indicator from the UE, and then may determine a BWP to be activated from a particular time point by being applied a configuration switched based on the configuration switching indicator. Also, the UE may perform monitoring on a PDCCH in a CORESET for which the activated BWP is configured.

In FIG. 4, the BS may transmit, in a slot #1 4-30, a configuration switching indicator 4-15 to indicate the UE to switch an activated BWP from the current BPW #1 4-05 to the BWP #2 4-10. After the UE receives the configuration switching indicator 4-15, the UE may activate the BWP #2 4-10 according to content of the indication. In this regard, a transition time 4-20 for switching of a BWP may be required, and a time point when to switch and apply a BWP to be activated may be determined based on the transition time 4-20. FIG. 4 illustrates a case where, after the configuration switching indicator 4-15 is received, the transition time 4-20 of one slot is requested. During the transition time 4-20, data transmission and reception may not be performed (see 4-60). Accordingly, the BWP #2 4-10 may be activated in a slot #2 4-35 and thus a control channel and data may be transmitted and received in the activated BWP #2 4-10.

The BS may previously configure one BWP or a plurality of BWPs for the UE via higher layer signaling (e.g., RRC signaling), and the configuration switching indicator 4-15 may indicate activation in a manner that one of BWP configurations preset by the BS is mapped For example, a $\log_2$ N-bit indicator may perform indication by selecting one of N preset BWPs. Hereinafter, with reference to [Table 3], an example in which configuration information about a BWP is indicated by using a 2-bit indicator.

TABLE 3

| Indicator value | BWP configuration |
|---|---|
| 00 | BWP configuration A configured via higher layer signaling |
| 01 | BWP configuration B configured via higher layer signaling |
| 10 | BWP configuration C configured via higher layer signaling |
| 11 | BWP configuration D configured via higher layer signaling |

The configuration switching indicator 4-15 described with reference to FIG. 4 may be transferred from the BS to the UE via MAC CE signaling or L1 signaling (e.g., common DCI, group-common DCI, or UE-specific DCI).

When to apply BWP activation in response to the configuration switching indicator 4-15 regarding a BWP described with reference to FIG. 4 may be determined based on one of following methods. When to apply configuration switching may be based on a predefined value (e.g., in N(=1) slot after a configuration switching indicator is received), may be configured from the BS to the US via higher layer signaling (e.g., RRC signaling), or may be added to and transmitted in the configuration switching indicator 4-15. Alternatively, when to apply configuration switching may be determined by combining the aforementioned methods. After the UE receives the configuration switching indicator 4-15 with respect to a BWP, the US may apply the switched configuration at a time point when the UE obtains the method about when to apply configuration switching.

Figure 5:
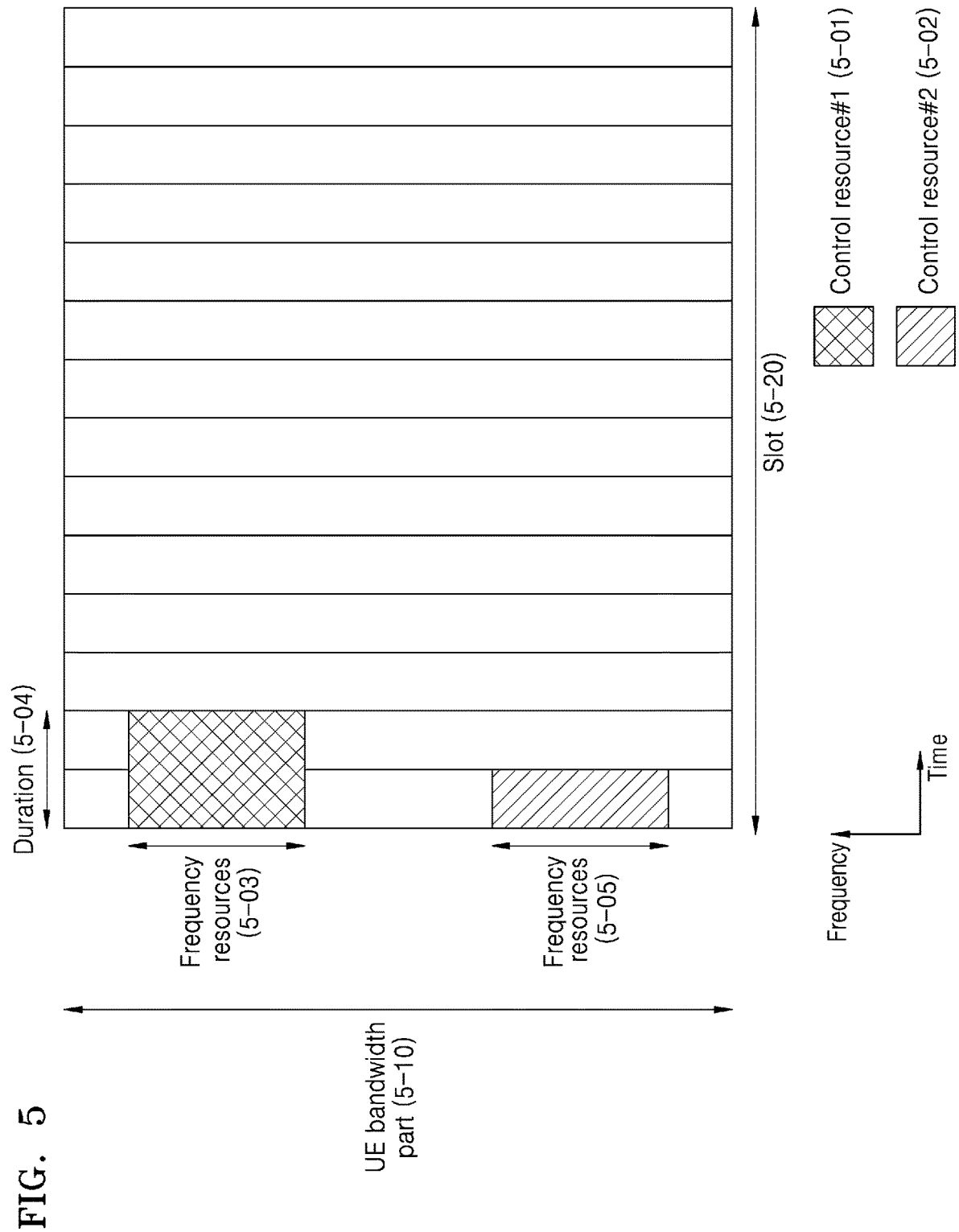
FIG. 5 illustrates a control resource set (CORESET) in which a downlink (DL) control channel is transmitted in the 5G system according to an embodiment of the disclosure.

FIG. 5 illustrates a control resource set (CORESET) in which a DL control channel is transmitted in the 5G system according to an embodiment of the disclosure.

Referring to FIG. 5, in the current embodiment of the disclosure, a UE BWP 5-10 may be configured on a frequency domain, and two CORESETs that are CORESET #1 5-01 and CORESET #2 5-02 may be configured in one slot 5-20 on a time domain. The CORESET #1 5-01 and the CORESET #2 5-02 may be configured on a particular frequency resource 5-03 and a particular frequency resource 5-05 in the entire UE BWP 5-10 on the frequency domain. The CORESET #1 5-01 and the CORESET #2 5-02 may each be configured as one or more OFDM symbols on the time domain and may each be defined as a CORESET duration 5-04. In an example of FIG. 5, the CORESET #1 5-01 is configured as a CORESET duration of two symbols, and the CORESET #2 5-02 is configured as a CORESET duration of one symbol.

A CORESET in the 5G system described above may be configured from the BS to the UE via higher layer signaling (e.g., via system information, a MIB, or RRC signaling). The configuration of the CORESET for the UE may mean that a plurality of pieces of information such as a CORESET identity, a frequency location of the CORESET, a symbol length of the CORESET, etc. are provided to the UE. For example, information for configuring a CORESET for the UE may include a plurality of pieces of information in Table 4.

TABLE 4

```
ControlResourceSet ::=                                    SEQUENCE {
    -- Corresponds to L1 parameter 'CORESET-ID'
    controlResourceSetId                                   ControlResourceSetId,
        (Control Resource Set ID(Identity))
    frequencyDomainResources                               BIT STRING (SIZE (45)),
        (Frequency Axis Resource Allocation Information)
    duration                                               INTEGER (1..maxCoReSetDuration),
        (Time Domian Resource Allocation Information)
    cce-REG-MappingType                                    CHOICE {
        (CCE-to-REG Mapping Scheme)
        interleaved                                        SEQUENCE {
            reg-BundleSize                                 ENUMERATED {n2, n3, n6},
                (REG Bundle Size)
            precoderGranularity                            ENUMERATED {sameAsREG-
        bundle, allContiguousRBs},
            interleaverSize                                ENUMERATED {n2, n3, n6}
                (Interleaver Size)
            shiftIndex
                INTEGER(0..maxNrofPhysicalResourceBlocks-1)
            OPTIONAL
                (Interleaver Shift)
        },
        nonInterleaved                                     NULL
    },
    tci-StatesPDCCH                                        SEQUENCE(SIZE
        (1..maxNrofTCI-StatesPDCCH)) OF TCI-StateId            OPTIONAL,
        (QCL Configuration Information)
    tci-PresentInDCI                                       ENUMERATED {enabled}
                                                           OPTIONAL,
    -- Need S
}
```

In Table 4, tci-StatesPDCCH (hereinafter, transmission configuration indication (TCI) state) configuration information may include information of indices of one or more synchronization signal (SS)/physical broadcast channel (PBCH) blocks or an index of a channel state information reference signal (CSI-RS) which are quasi co-located (QCL) with respect to a demodulation reference signal (DMRS).

Hereinafter, methods of allocating time and frequency resources for data transmission in an NR system will now be described.

According to the NR system, in addition to frequency domain resource candidate allocation via BWP indication, frequency domain resource allocation (FD-RA) methods may be further provided.

Figure 6:
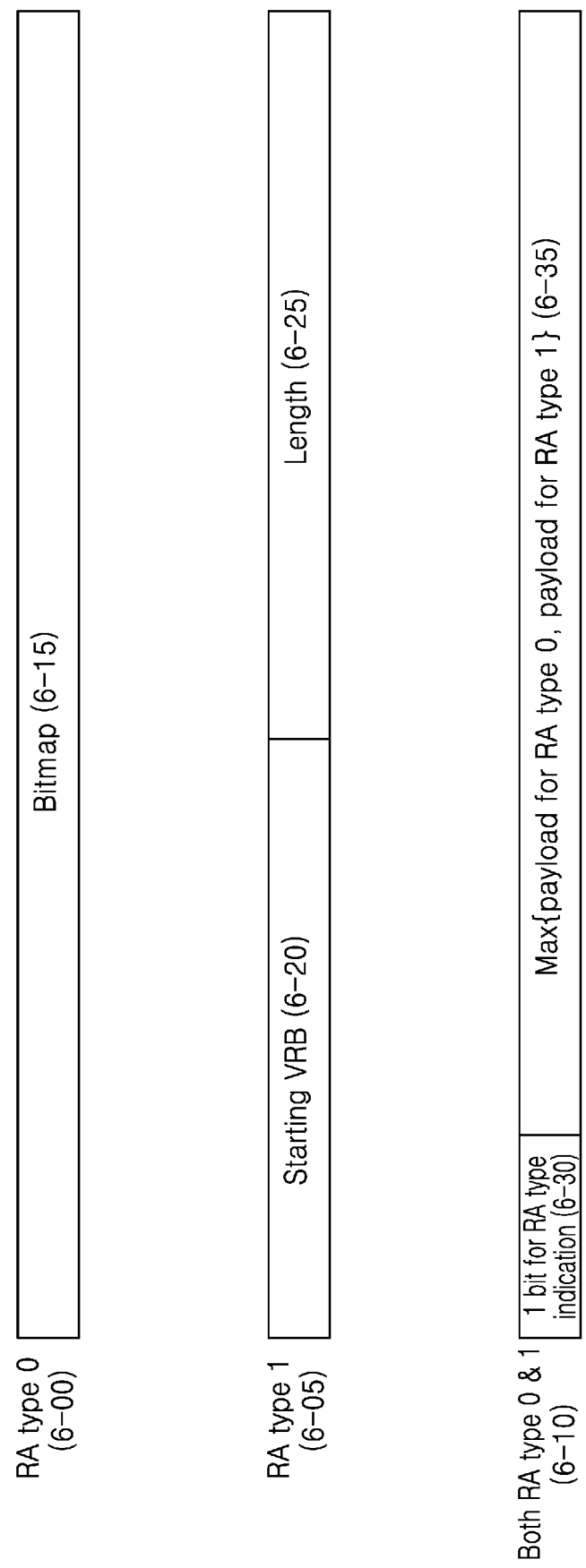
FIG. 6 illustrates a physical downlink shared channel (PDSCH) frequency domain resource allocation method in a new radio (NR) system according to an embodiment of the disclosure.

FIG. 6 illustrates a physical downlink shared channel (PDSCH) frequency domain resource allocation method in the NR system according to an embodiment of the disclosure.

Referring to FIG. 6, in the NR system, a frequency domain resource allocation method may include type 0 6-00, type 1 6-05, and dynamic switch 6-10 which are configurable via higher layer signaling.

In a case where a UE is configured to use only resource type 0 via higher layer signaling (6-00), DCI for scheduling a PDSCH to the UE has a bitmap including NRBG bits. A condition therefor will be described at a later time. In this regard, NRBG denotes the number of resource block groups (RBGs) determined based on a BWP size allocated by a BWP indicator and a higher layer parameter rbg-Size as in [Table 5], and data is to be transmitted in a RBG marked as 1 in the bitmap.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In a case where the UE is configured to use only resource type 1 via higher layer signaling (6-05), DCI for scheduling a PDSCH to the UE has frequency domain resource allocation information including $\lceil \log_2(N_{RB}^{DL,BWP}(N_{RB}^{DL,BWP}+1)/2) \rceil$ bits. A condition therefor will be described at a later time. A BS may configure a starting VRB 6-20 and a length 6-25 of frequency domain resources successively allocated after the VRB 6-20.

In a case where the UE is configured to use both resource type 0 and resource type 1 via higher layer signaling (6-10), DCI for scheduling a PDSCH to the UE has frequency domain resource allocation information including bits of a large value 6-35 from among a payload 6-15 for configuring resource type 0 and payloads 6-20 and 6-25 for configuring resource type 1. A condition therefor will be described at a later time. In this regard, one bit may be added to a most significant bit (MSB) of the frequency domain resource allocation information in the DCI, and when the bit is 0, the use of resource type 0 may be indicated, and when the bit is 1, the use of resource type 1 may be indicated.

Figure 7:
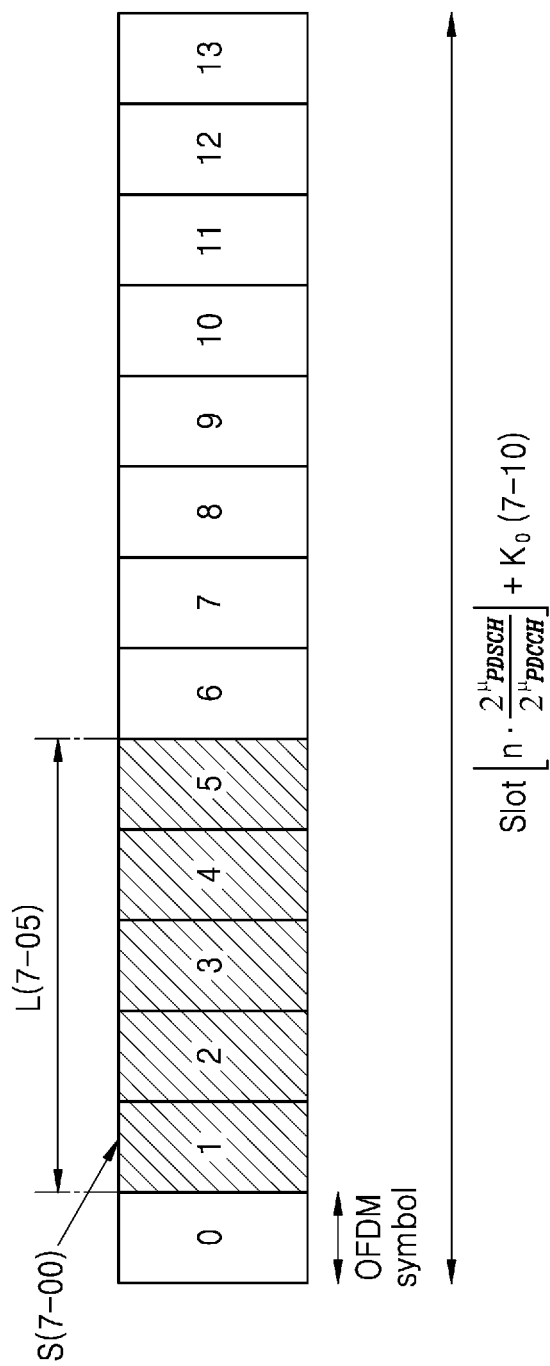
FIG. 7 illustrates a PDSCH time domain resource allocation method in a wireless communication system according to an embodiment of the disclosure.

FIG. 7 illustrates a PDSCH time domain resource allocation method in a wireless communication system according to an embodiment of the disclosure.

Referring to FIG. 7, a BS may indicate subcarrier spacing $\mu_{PDSCH}$ and $\mu_{PDCCH}$ of a data channel and a control channel that are configured via higher layer signaling, a scheduling offset value $K_0$, and a time domain location of a PDSCH resource according to a starting location 7-00 and a length 7-05 of OFDM symbols in a slot, the location 7-00 and the length 7-05 being dynamically indicated via DCI.

Figure 8:
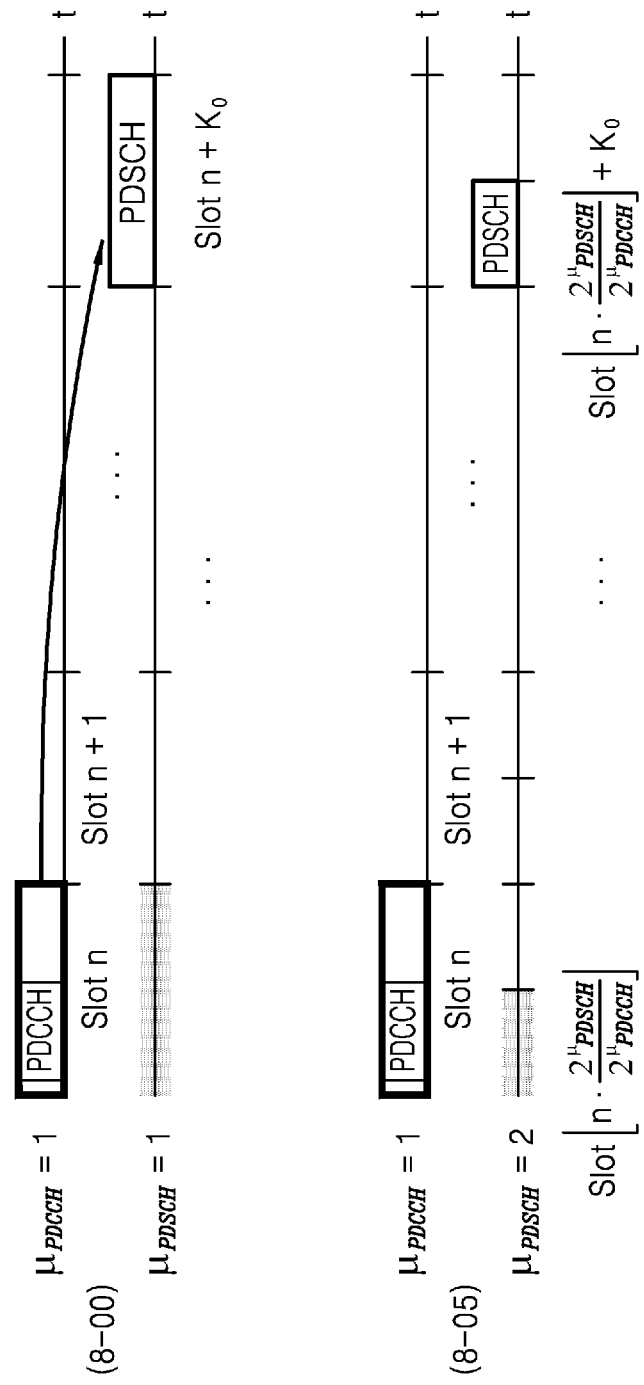
FIG. 8 illustrates a time domain resource allocation method according to subcarrier spacings of a data channel and a control channel in a wireless communication system according to an embodiment of the disclosure.

FIG. 8 illustrates a time domain resource allocation method according to subcarrier spacings of a data channel and a control channel in a wireless communication system according to an embodiment of the disclosure.

Referring to FIG. 8, when subcarrier spacings of the data channel and the control channel are equal to each other (8-00, $\mu_{PDSCH}=\mu_{PDCCH}$), slot numbers for the data channel and the control channel are same, and thus a BS and a UE may detect that a scheduling offset is to occur in synchronization with a predetermined slot offset $K_0$.

On the other hand, when subcarrier spacings of the data channel and the control channel are different from each other (8-05, $\mu_{PDSCH}\neq\mu_{PDCCH}$), slot numbers for the data channel and the control channel are different, and thus the BS and the UE may detect that a scheduling offset is to occur in synchronization with a predetermined slot offset $K_0$, based on subcarrier spacing of a PDCCH.

The NR system provides a DCI format as in [Table 6] below so as to allow the UE to efficiently receive a control channel.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the BS may use DCI format 0_0 or DCI format 0_1 to schedule a PDSCH to one cell.

When DCI format 0_1 is transmitted along with a cell radio network temporary identifier (C-RNTI), a configured scheduling RNTI (CS-RNTI), or a cyclic redundancy check (CRC) scrambled by a new-RNTI, DCI format 0_1 may include at least information below:

Identifier for DCI formats (1 bit): DCI format indicator that is always configured as 1.

Frequency domain resource assignment ($N_{RBG}$ bits or $\lceil \log_2(N_{RB}^{DL,BWP}(N_{RB}^{DL,BWP}+1)/2) \rceil$ bits): this indicates frequency domain resource allocation, and when DCI format 1_0 is monitored in a UE-specific search space, $N_{RB}^{DL,BWP}$ indicates a size of an active DL BWP, and except the indication, $N_{RB}^{DL,BWP}$ denotes a size of an initial DL BWP. NRBG denotes a resource block group number. Detailed methods refer to the frequency domain resource allocation.

Time domain resource assignment (0 to 4 bits): time domain resource assignment is indicated according to the descriptions above.

VRB-to-PRB mapping (1 bit): when 0, this indicates non-interleaved, and when 1, this indicates interleaved VRB-to-PRB mapping.

Modulation and coding scheme (5 bits): this indicates a modulation order and a coding rate used in PDSCH transmission.

New data indicator (1 bit): according to whether this indicator is toggled or not, whether a PDSCH is initially transmitted or retransmitted is indicated.

Redundancy version (2 bits): this indicates a redundancy version used in PDSCH transmission.

Hybrid automatic repeat request (HARQ) process number (4 bits); this indicates a HARQ process number used in PDSCH transmission.

Downlink assignment index (2 bits): DAI indicator.

Transmission power control (TPC) command for scheduled physical uplink control channel (PUCCH) (2 bits): PUCCH power control indicator.

PUCCH resource indicator (3 bits): PUCCH resource indicator that indicates one of 8 resources configured via higher layer signaling.

PDSCH-to-HARQ_feedback timing indicator (3 bits): This is a HARQ feedback timing indicator indicating one of 8 feedback timing offsets configured via higher layer signaling.

When DCI format 1_1 is transmitted along with a C-RNTI, a CS-RNTI, or a CRC scrambled by a new-RNTI, DCI format 1_1 may include at least information below:

Identifier for DCI formats (1 bit): DCI format indicator that is always configured as 1.

Carrier indicator (0 or 3 bits): this indicates a CC (or a cell) on which a PDSCH scheduled by DCI is transmitted.

Bandwidth part (BWP) indicator (0, 1, or 2 bits); this indicates a BWP on which a PDSCH scheduled by DCI is transmitted.

Frequency domain resource assignment (payload determination according to the frequency domain resource allocation): this indicates frequency domain resource allocation, and $N_{RB}^{DL,BWP}$ denotes a size of an active DL BWP. Detailed methods refer to the frequency domain resource allocation.

Time domain resource assignment (0 to 4 bits): time domain resource assignment is indicated according to the descriptions above.

VRB-to-PRB mapping (0 or 1 bit): when 0, this indicates non-interleaved, and when 1, this indicates interleaved VRB-to-PRB mapping. When frequency domain resource allocation is configured as resource type 0, 0 bit.

PRB bundling size indicator (0 or 1 bit): when a higher layer parameter prb-BundlingType is not configured or is configured as "static," the PRB bundling size indicator is 0 bit, and when configured as "dynamic," the PRB bundling size indicator is 1 bit.

Rate matching indicator (0, 1, or 2 bits): this indicates a rate matching pattern.

ZP CSI-RS trigger (0, 1, or 2 bits): this indicator triggers an aperiodic ZP CSI-RS.

For transport block 1:

Modulation and coding scheme (5 bits): this indicates a modulation order and a coding rate used in PDSCH transmission.

New data indicator (1 bit): according to whether this indicator is toggled or not, whether a PDSCH is initially transmitted or retransmitted is indicated.

Redundancy version (2 bits): this indicates a redundancy version used in PDSCH transmission.

For transport block 2:

Modulation and coding scheme (5 bits): this indicates a modulation order and a coding rate used in PDSCH transmission.

New data indicator (1 bit): according to whether this indicator is toggled or not, whether a PDSCH is initially transmitted or retransmitted is indicated.

Redundancy version (2 bits): this indicates a redundancy version used in PDSCH transmission.

Hybrid automatic repeat request (HARQ) process number (4 bits): this indicates a HARQ process number used in PDSCH transmission.

Downlink assignment index (0, 2, or 4 bits): a DAI indicator

Transmission power control (TPC) command for scheduled physical uplink control channel (PUCCH) (2 bits): a PUCCH power control indicator.

PUCCH resource indicator (3 bits): PUCCH resource indicator that indicates one of 8 resources configured via higher layer signaling.

PDSCH-to-HARQ_feedback timing indicator (3 bits): this is a HARQ feedback timing indicator indicating one of 8 feedback timing offsets configured via higher layer signaling.

Antenna port (4, 5, or 6 bits): this indicates a DMRS port and code division multiplexing (CDM) group without data.

Transmission configuration indication (0 or 3 bits): a TCI indicator.

SRS request (2 or 3 bits): an SRS transmission request indicator.

CBG transmission information (0, 2, 4, 6, or 8 bits): this indicator indicates whether a code block group in a scheduled PDSCH is to be transmitted. 0 indicates a corresponding CBG is not to be transmitted, and 1 indicates the corresponding CBG is to be transmitted.

CBG flushing out information (0 or 1 bit): this indicator indicates whether previous CBGs are corrupted. 0 indicates corruption, and 1 indicates "combinable" meaning that the previous CBGs are usable in receiving retransmission.

DMRS sequence initialization (0 or 1 bit): a DMRS scrambling ID selection indicator.

The maximum number of DCI with different sizes the UE can receive per slot in a cell is 4. The maximum number of DCI which are scrambled by a C-RNTI and have different sizes the UE can receive per slot in a cell is 3.

In this regard, antenna port indication may be indicated based on Table 7 to Table 10.

TABLE 7

| Antenna port(s) (1000 + DMRS port), dmrs-Type = 1, maxLength = 1 One Codeword: Codeword 0 enabled, Codeword 1 disabled | | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 8

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 9

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 28-31 | Reserved | Reserved | | | |

TABLE 10

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

A DMRS port is indicated by using Table 7 when dmrs-type is indicated as 1, and maxLength is indicated as 1; Table 8 when indicated as dmrs-Type=1, mauLength=2, dmrs-type=2,maxLength=1; Table 9 when dmrs-type=2,maxLength=1; and Table 10 when dmrs-type is 2 and maxLength is 2. In Table, 1, 2, 3 indicated by Number of DMRS CDM group(s) without data denote CDMR group {0}, {0, 1}, {0, 1, 2}, respectively. DMRS port(s) denote in order indices of a port being used. An antenna port is indicated as DMRS port+1000. CDM group of DMRS is connected with a DMRS sequence generation method and an antenna port as in Table 11 and Table 12. Table 11 shows parameters of a case of dmrs-type=1, and Table 12 shows parameters of a case of dmrs-type=2.

TABLE 11

Parameters for PDSCH DMRS dmrs-type = 1.

| CDM group | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 12

Parameters for PDSCH DMRS dmrs-type = 2.

| CDM group | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

A sequence of DMRS according to each parameter may be determined by using Equation (1) below.

$$a_{k,l}^{(p,\mu)} = \beta_{PDSCH}^{DMRS} w_f(k') w_t(l') r(2n + k')$$ Equation (1)

$$k = \begin{cases} 4n + 2k' + \Delta & \text{Configuration type 1} \\ 6n + k'\Delta & \text{Configuration type 2} \end{cases}$$

$$k' = 0, 1$$

$$l = \bar{l} + l'$$

$$n = 0, 1, \ldots$$

When only one codeword is enabled in Table 7 and Table 8, rows 2, 9, 10, 11, and 30 may be used only for single user MIMO. That is, in this case, the UE does not assume that another terminal is co-scheduled, and thus may not perform a multi-user MIMO reception operation including cancellation, nulling, or whitening of multi-user interference.

When only one codeword is enabled in Table 9 and Table 10, rows 2, 10, and 23 may be used only for single user MIMO. That is, in this case, the UE does not assume that another terminal is co-scheduled, and thus may not perform a multi-user MIMO reception operation including cancellation, nulling, or whitening of multi-user interference.

Figure 9:
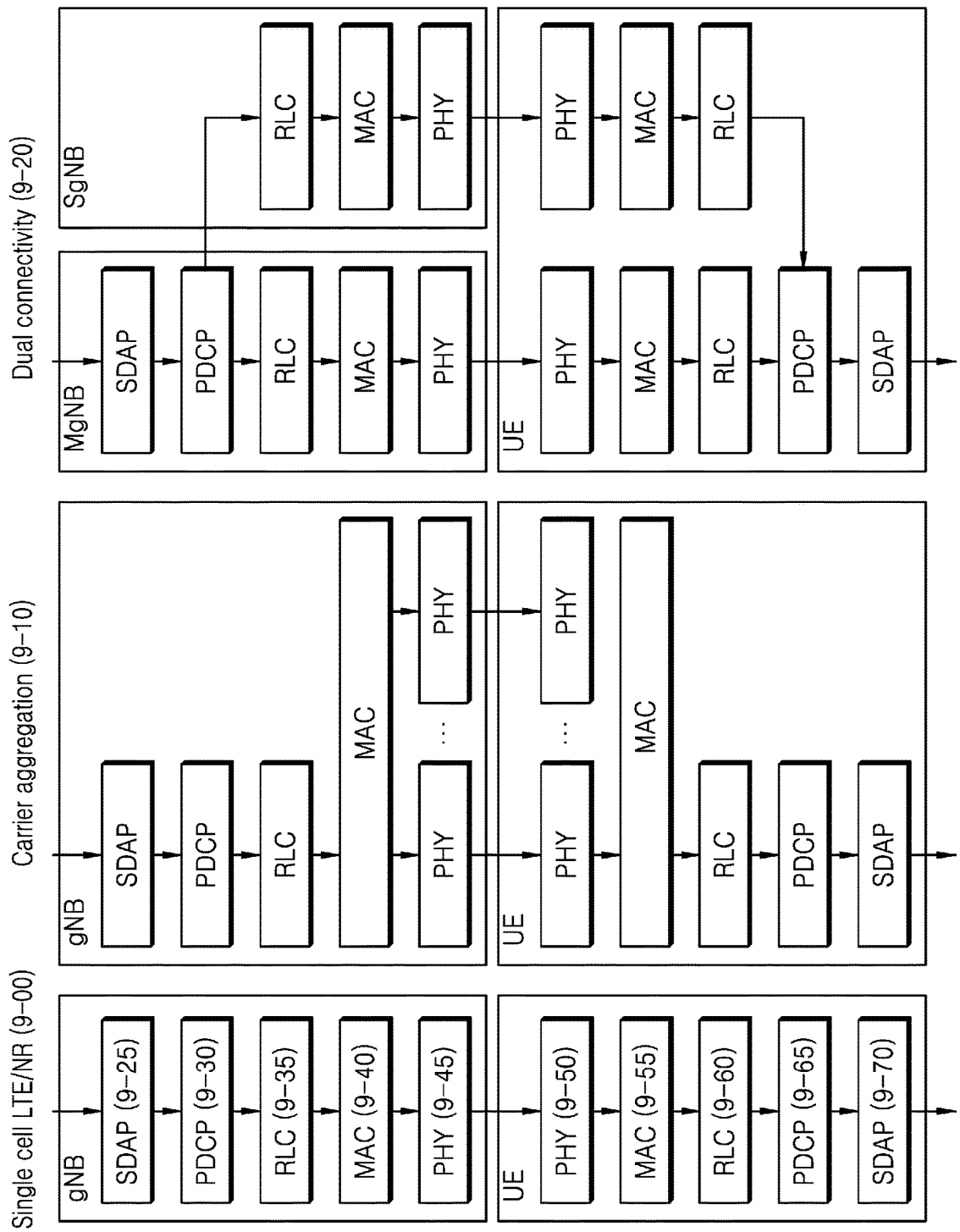
FIG. 9 illustrates radio protocol architectures of a next generation Node B (gNB) and a user equipment (UE) when operating in a single cell, carrier aggregation, and dual connectivity.

FIG. 9 illustrates radio protocol architectures of a gNB and a UE when operating in a single cell, carrier aggregation, and dual connectivity.

Referring to FIG. 9, a radio protocol of the NR system may include NR service data adaptation protocol (SDAP) layers 9-25 and 9-70, NR packet data convergence protocol (PDCP) layers 9-30 and 9-65, NR radio link control (RLC) layers 9-35 and 9-60, and NR medium access control (MAC) layers 9-40 and 9-55 respectively for the gNB and the UE.

Main functions of the NR SDAP layer 9-25 or 9-70 may include some of the following functions:
  Transfer of user plane data;
  Mapping between a QoS flow and a data radio bearer (DRB) for both DL and UL;
  Marking QoS flow identifier (ID) in both DL and UL packets; and
  Reflective QoS flow to DRB mapping for the UL SDAP Protocol Data Units (PDUs).

With regard to a SDAP layer, the UE may be configured, through an RRC message, whether to use a header of the SDAP layer or to use functions of the SDAP layer per PDCP layer, per bearer, or per logical channel. When the SDAP header is configured, the gNB may indicate the UE to update or reconfigure UL and DL QoS flow and data bearer mapping information via a 1-bit non access stratum (NAS) reflective QoS indicator and a 1-bit access stratum (AS) reflective QoS indicator of the SDAP header. The SDAP header may include QoS flow ID information indicating QoS. The QoS information may be used as data processing priority information or scheduling information for appropriately supporting a service.

Main functions of the NR PDCP layer 9-30 or 9-65 may include some of the following functions;
  Header compression and decompression: ROHC only;
  Transfer of user data;
  In-sequence delivery of upper layer PDUs;
  Out-of-sequence delivery of upper layer PDUs;
  PDCP PDU reordering for reception;
  Duplicate detection of lower layer SDUs;
  Retransmission of PDCP SDUs;
  Ciphering and deciphering; and
  Timer-based SDU discard in uplink.

The reordering function of the NR PDCP layer 9-30 or 9-65 may indicate a function of reordering PDCP PDUs received from a lower layer, on a PDCP sequence number (SN) basis. The reordering function may include a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

Main functions of the NR RLC layer 9-35 or 9-60 may include some of the following functions:
  Transfer of upper layer PDUs;
  In-sequence delivery of upper layer PDUs;
  Out-of-sequence delivery of upper layer PDUs;
  Error correction through ARQ;
  Concatenation, segmentation and reassembly of RLC SDUs;
  Re-segmentation of RLC data PDUs;
  Reordering of RLC data PDUs;
  Duplicate detection;
  Protocol error detection;
  RLC SDU discard; and
  RLC re-establishment.

The in-sequence delivery function of the NR RLC layer 9-35 or 9-60 may indicate a function of delivering RLC SDUs received from a lower layer, to an upper layer in order. The in-sequence delivery function may include a function of reassembling the RLC SDUs and delivering the reassembled RLC SDU when a plurality of RLC SDUs segmented from one RLC SDU are received, a function of reordering received RLC PDUs on a RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a preset timer expires, or a function of delivering all RLC SDUs received up to a current time, to an upper layer in order when a preset timer expires, even when a missing RLC SDU exists. The NR RLC layer 9-35 or 9-60 may process the RLC PDUs in order of reception and deliver the RLC PDUs to the NR PDCP layer 9-30 or 9-65 regardless of SNs (out-of-sequence delivery). When a segment is received, the NR RLC layer 9-35 or 9-60 may reassemble the segment with other segments stored in a buffer or subsequently received, into a whole RLC PDU and may deliver the RLC PDU to the NR PDCP layer 9-30 or 9-65. The NR RLC layer 9-35 or 9-60 may not have a concatenation function, and the concatenation function may be performed by the NR MAC layer 9-40 or 9-55 or be replaced with a multiplexing function of the NR MAC layer 9-40 or 9-55.

The out-of-sequence delivery function of the NR RLC layer 9-35 or 9-60 may include a function of directly delivering RLC SDUs received from a lower layer, to an upper layer out of order, a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

The NR MAC layer 9-40 or 9-55 may be connected to a plurality of NR RLC layers configured for one UE, and main functions of the NR MAC layer 9-40 or 9-55 may include some of the following functions:

Mapping between logical channels and transport channels;
Multiplexing/demultiplexing of MAC SDUs;
Scheduling information reporting;
Error correction through HARQ;
Priority handling between logical channels of one UE;
Priority handling between UEs by means of dynamic scheduling;
Multimedia Broadcast Multicast Service (MBMS) service identification;
Transport format selection; and
Padding.

An NR physical (PHY) layer 9-45 or 9-50 may channel-code and modulate upper layer data into OFDM symbols and may transmit the OFDM symbols through a radio channel, or may demodulate OFDM symbols received through a radio channel and channel-decode and may deliver the OFDM symbols to an upper layer.

The aforementioned radio protocol architecture may be variously modified according to carrier (or cell) operation schemes. For example, when the gNB transmits data to the UE via single carrier (or a cell), the gNB and the UE use a protocol architecture where each layer has a single structure as shown in the architecture 9-00. However, when the gNB transmits data to the UE via carrier aggregation (CA) using multicarrier at a transmission reception point (TRP), the gNB and the UE use protocol architecture where a single structure is maintained until a RLC layer and then a PHY layer is multiplexed through a MAC layer as shown in architecture 9-10 As another example, when the gNB transmits data to the UE via dual connectivity (DC) using multi-carrier at multiple TRPs, the gNB and the UE use protocol architecture where a single structure is maintained until a RLC layer and then a PHY layer is multiplexed through a MAC layer as shown in architecture 9-20.

In the LTE and NR, the UE performs a procedure of reporting, to a serving BS, capability supported by the UE when the UE is connected to the serving BS. In descriptions below, the report by the UE is called a UE capability report. The serving BS may transfer a UE capability enquiry message requesting the UE to perform a capability report to the UE in a connected state. The UE capability enquiry message may include a UE capability request from the BS according to each radio access technology (RAT) type. The request according to each RAT type may include requested frequency band information.

Also, the UE capability enquiry message may request a plurality of RAT types in one RRC message container. According to another embodiment of the disclosure, the UE capability enquiry message including the request according to each RAT type may be transferred to a plurality of UEs. The UE capability enquiry is repeated a plurality of times, and the UE may configure a UE capability information message corresponding thereto and may perform reporting a plurality of times. In the NR system, UE capability with respect to NR, LTE, EN-DC and MR-DC may be requested. It is general that the UE capability enquiry message is transmitted in an initial stage after the UE is connected, but the BS may request the UE capability report in any condition when the BS requires it.

After the UE receives the UE capability report request from the BS, the UE may configure UE capability according to the RAT type and band information requested by the BS. Hereinafter, a method by which the UE configures UE capability in the NR system will now be described.

1 When the UE is provided a list of LTE and/or NR bands as a UE capability request from the BS, the UE may configure a band combination (BC) with respect to EN-DC and NR stand alone (SA). That is, the UE may configure a BC candidate list with respect to EN-DC and NR SA based on bands requested in FreqBandList by the BS. Also, the bands may have priorities according to an order of listed inFreqBandList.

2. When the BS sets "eutra-nr-only" flag or "eutra" flag and requests the UE for the UE capability report, the UE may completely remove items about NR SA BCs from the BC candidate list. This removal occurs only when an LTE BS (eNB) requests "eutra" capability.

3. Afterward, the UE removes fallback BC from the BC candidate list. In this regard, the fallback BC corresponds to a case where a band corresponding to at least one SCell is removed from a certain super set BC, and because the super set BC can cover the fallback BC, the fallback BC may be skipped. This stage is also applicable to MR-DC, i.e., is applicable to LTE bands. BCs after this stage are a final "candidate BC list."

4. The UE may select, in the final "candidate BC list," the BCs matching the requested RAT type, thereby selecting BCs to be reported. In this stage, the UE configures supportedBandCombinationList according to a set order. That is, the UE may configure the BCs to be reported and UE capability according to a preset order of RAT-type. (nr->eutra-nr->eutra). Also, the UE configures featureSetCombination with respect to the configured supportedBandCombinationList, and configures a list of "candidate feature set combinations" from the candidate BC list from which a list of the fallback BC (including capability of equal or lower level) is removed The "candidate feature set combinations" may include all of feature set combinations with respect to NR and EUTRA-NR BC, and may be obtained from feature set combinations of a UE-NR-Capabilities container and a UE-MRDC-Capabilities container.

5. When the requested RAT type is EUTRA-NR and is effective, featureSetCombinations are included in both the UE-MRDC-Capabilities container and the UE-NR-Capabilities container. However, a feature set of NRs is included in only UE-NR-Capabilities.

After the UE capability is configured, the UE transfers a UE capability information message including the UE capability to the BS. Based on the UE capability received from the UE, the BS may perform appropriate scheduling and transmission/reception management on the UE.

Figure 10:
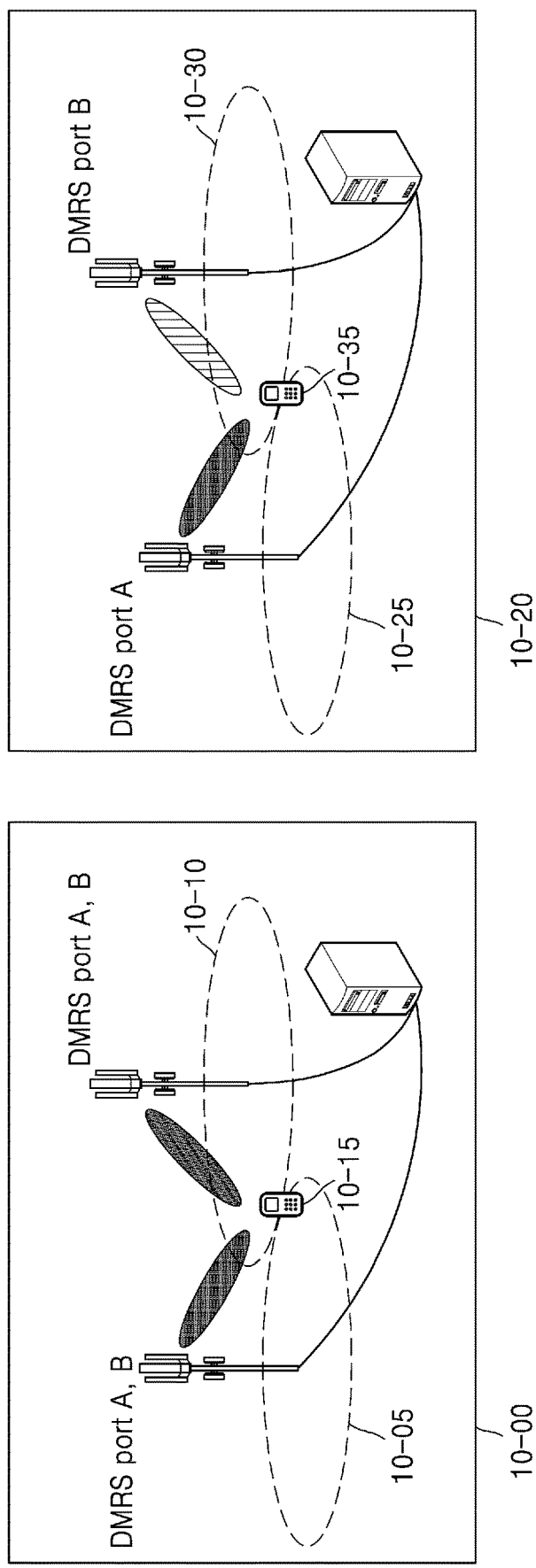
FIG. 10 illustrates an antenna port configuration of cooperative communication according to an embodiment of the disclosure.

FIG. 10 illustrates an antenna port configuration of cooperative communication according to an embodiment of the disclosure.

Referring to FIG. 10, examples of radio resource application according to joint transmission (JT) schemes and TRPs according to situations are illustrated. In FIG. 10, drawing 10-00 illustrates coherent joint transmission (C-JT) that supports coherent precoding between cells, TRPs, and/or beams. In C-JT, same data (PDSCH) is transmitted from TRP A 10-05 and TRP B 10-10, and joint precoding may be performed in a plurality of TRPs. This may mean that TRP A 10-05 and TRP B 10-10 transmit same DMRS ports (e.g., DMRS ports A and B from both TRPs) for receiving a same PDSCH. In this case, the UE may receive one DCI to receive one PDSCH that is demodulated by DMRS ports A and B.

In FIG. 10, drawing 10-20 illustrates non-coherent joint transmission (NC-JT) that supports non-coherent precoding between cells, TRPs, and/or beams.

In NC-JT, different PDSCHs are transmitted from cells, TRPs, and/or beams, and thus, precoding may be differently applied to each PDSCH. This may mean that TRP A 10-25 and TRP B 10-30 transmit different DMRS ports (e.g., DMRS port A from TRP A and DMRS port B from TRP B) for receiving different PDSCHs. In this case, the UE may receive two types of DCI to receive PDSCH A modulated by DMRS port A and PDSCH B modulated by DMRS port B.

In order to support NC-JT that simultaneously provides data to the UE from two or more transmission points, it is required to allocate PDSCHs to be transmitted from at least two different transmission points via one PDCCH or to allocate PDSCHs to be transmitted from at least two different transmission points via multiple PDCCHs. The UE may obtain QCL relations between reference signals or channels, based on L1/L2/L3 signaling, and may efficiently estimate large scale parameters of each reference signal or each channel, based on the relations. When a transmission point of a certain reference signal or channel is different, it is difficult for large scale parameters to be shared, and thus, when cooperative communication is performed, it is required for the BS to simultaneously inform the UE about QCL information about at least two transmission points via at least two TCI states.

When NC-JT is supported via multiple PDCCHs, i.e., when at least two PDCCHs allocate at least two PDSCHs to a same serving cell and a same BWP at a same time point, at least two TCI states may be allocated respectively to PDSCHs or DMRS ports via PDCCHs. On the other hand, when NC-JT is supported via one PDCCH, i.e., when one PDCCH allocates at least two PDSCHs to a same serving cell and a same BWP at a same time point, at least two TCI states may be allocated respectively to PDSCHs or DMRS ports via one PDCCH.

When it is assumed that DMRS ports that are allocated to the UE at a preset time point are divided to DMRS port group A transmitted at transmission point A and DMRS port group B transmitted at transmission point B, at least two TCI states may be connected to respective DMRS port groups, and channels may be estimated based on different QCL assumptions of respective groups. Different DMRS ports may be code division multiplexed, frequency division multiplexed, or time domain multiplexed to increase channel estimation accuracy and simultaneously to decrease transmission load. When DMRS ports that are to be code division multiplexed are collectively called a code division multiplexing (CDM) group, code-based multiplexing operates well on the DMRS ports in the CDM group when channel features of each port are similar (i.e., when channel features of each port are similar, differentiation based on orthogonal cover code (OCC) operates well), and thus, it may be important that DMRS ports in a same CDM group do not have different TCI states. In the disclosure, provided is a method of indicating a DMRS port and a CDM group to the UE, the DMRS port and the CDM group satisfying the aforementioned features.

Hereinafter, for convenience of descriptions, Table X to Table Y are called "first antenna port indication (or, legacy antenna port indication)," and Table where some or all of code points of Table X to Table Y are modified is called "second antenna port indication (or new antenna port indication)." Also, allocation of a DMRS port and a CDM group is called DMRS allocation.

The UE may determine the number of antenna ports used to transmit PDSCHs, based on Table indicating DMRS ports. In DCI Format 1_1, an antenna port indication method based on new radio (NR) NR Rel-15 specification is determined based on an index with a length of 4 to 6 bits indicated by an antenna port field in DCI. The UE may identify the number and index of DMRS ports for PDSCHs, the number of front-load symbols, and information about the number of CDM groups, based on an indicator (index) transmitted from the BS. Also, the UE may determine a dynamic change in a beamforming direction, based on information of a TCI field in DCI Format 1_1. When tci-PresentDCI is configured as 'enabled' in an upper layer, the UE may check the TCI field of 3-bit information and thus may determine a beam direction associated with activated TCI states and DL-RS on a DL BWP or scheduled component carrier. On the other hand, when tci-PresentDCI is disabled, the UE may determine that there is no change in a beam direction of beamforming.

In various embodiments of the disclosure, a scenario in which PDSCHs to be transmitted at least two different transmission points are allocated via one PDCCH is considered. A UE of NR Rel-15 specification may receive a PDSCH stream including one or more layers QCLed based on TCI information and antenna port information in one PDCCH. On the other hand, a UE of NR Rel-16 specification may receive data in a C-JT or NC-JT manner, the data being transmitted from multiple TRPs or a plurality of BSs. In order to support C-JT or NC-JT, the UE of NR Rel-16 specification requires basic upper layer configuration. In detail, the UE may receive C-JT/NC-JT related parameters or setting values via an upper layer and may perform configuration to support C-JT/NC-JT, based on the received parameters or setting value.

First Embodiment

A BS and a UE which support C-JT/NC-JT may obtain, via upper layer configuration, separate DMRS port table so as to transmit and receive C-JT/NC-JT signals. According to an embodiment of the disclosure, DMRS port table may be distinguished from DMRS Table an antenna port field indicates based on DCI format 1_1. To distinguish from DMRS Table provided in NR Rel-15 specification, the BS and the UE may pre-configure, in RRC configuration, information about whether NC-JT transmission is supported. That is, due to a field value such as C-JT/NC-JT transmission=enabled/ disabled in RRC, it is possible to determine whether the UE supports C-JT/NC-JT transmission.

For a UE configured with C-JT/NC-JT transmission= enabled in an upper layer, a field to be used by the UE may be indicated by using an existing antenna port field in DCI format 1_1. As another example, by using a separate field other than an antenna port field in DCI format 1_1, information about at least one of a DMRS port number for NC-JT transmission, the number of DMRS CDM group(s) except for data, the (maximum)number of front-loaded symbols, or DMRS-type may be indicated to the UE.

Table 12-1 to Table 12-4 provide DMRS ports in such a manner that the DMRS ports to be transmitted at a same TRP are transmitted to a same CDM group, based on CDM groups described with reference to Table 11. In Table 12-1 to Table 12-4, the left and the right indicate different TRP transmissions and different CDM group mapping with respect to semicolon (;), but this indication may be skipped in another embodiment of the disclosure. Also, the DMRS ports described in Tables show a case where maximum two DMRS ports are supported at first TRP and second TRP, respectively. Also, basic concepts of a DMRS port, a type, and the number of front-loaded symbols described with reference to Table 7 to Table 10 may be equally applied to Table 12-1 to Table 12-4.

DMRS Table such as Table 12-1 for C-JT/NC-JT may support a different port type distinguished from a port that is not supported in NR Rel-15 specification. For example, when the BS indicates entry 0 to the UE, the UE may determine that the BS transmits DMRS port 0 and DMRS port 2 at first TRP and second TRP. When the UE checks that the number of each of DMRS ports is 1, the UE may determine that single-layer transmission is to be performed at the first TRP and the second TRP. When the BS indicates entry 1 to the UE, the UE may determine that the BS transmits DMRS port 1 and DMRS port 3 at the first TRP and the second TRP. When the UE checks that the number of each of DMRS ports is 1, the UE may determine that single-layer transmission is to be performed at the first TRP and the second TRP. Although entry 1 has a port number different from that of entry 0, entry 1 is technically similar to entry 0 and thus may be regarded as repetition of entry 0 and then may be skipped.

When the BS indicates entry 2 to the UE, the UE may determine that the BS transmits DMRS port 0 and DMRS port 1 at the first TRP, and transmits DMRS port 2 at the second TRP. When the UE checks that the number of each of DMRS ports is 2 and 1, the UE may determine that double-layer transmission is to be performed at the first TRP and single-layer transmission is to be performed at the second TRP. When the BS indicates entry 3 to the UE, the UE may determine that the BS transmits DMRS port 0 at the first TRP, and transmits DMRS port 2 and DMRS port 3 at the second TRP. When the UE checks that the number of each of DMRS ports is 1 and 2, the UE may determine that single-layer transmission is to be performed at the first TRP and double-layer transmission is to be performed at the second TRP. Operations of the BS and the UE for entry 4 and entry 5 would be easily understood in view of operations of the BS and the UE for entry 2 and entry 3. Although entry 4 and entry 5 have port numbers different from those of entry 2 and entry 3, entry 4 and entry 5 are technically similar to entry 2 and entry 3 and thus may be skipped.

When the BS indicates entry 6 to the UE, the UE may determine that the BS transmits DMRS port 0 and DMRS port 1 at the first TRP, and transmits DMRS port 2 and DMRS port 3 at the second TRP. When the UE checks that the number of each of DMRS ports is 2, the UE may determine that double-layer transmission is to be performed at the first TRP and double-layer transmission is to be performed at the second TRP. Table 12-1 shows, in an entry form, embodiments from among various cases where the BS and the UE communicate with each other, and all or some of 7 entries may be applied to an actual system. With respect to Table 12-1, it is assumed that the BS transmits one codeword to the UE, but Table 12-1 may be similarly applied to a case where the BS transmits two or more codewords to the UE.

Table 12-2 shows DMRS port configuration of a case where maxLength=2 that is different in DMRS type 2 described in Table 12-1. Referring to Table 7 to Table 8, DMRS port configuration for C-JT/NC-JT may be mapped in a same form as maxLength=1 with respect to DMRS ports 0 to 3.

Table 12-3 is a DMRS table for C-JT/NC-JT transmission of DMRS type 2 that is different from DMRS type 1 described with reference to Table 12-1. Table 12-2 supports maximum 12 DMRS ports which are appropriate for a MU-MIMO form. For example, when the BS indicates entry 0 to the UE, the UE may determine that the BS transmits DMRS port 0 and DMRS port 2 at the first TRP and the second TRP. When the UE checks that the number of each of DMRS ports is 1, the UE may determine that single-layer transmission is to be performed at the first TRP and the second TRP. Entries of Table 12-3 collectively correspond to cases where the number of DMRS CDM groups is 2 and 3, and it is not excluded that 2 and 3 are divided to distinguished entries. The embodiments are in an entry form, and all or some of 14 entries may be applied to an actual system. For example, Table for some of the entries may be determined by using only entries 0, 2, 3, 6, 7, 9, 10, and 13. In the above embodiment of the disclosure, an order of entries is merely an example and thus the disclosure is not limited thereto. With respect to Table 12-3, it is assumed that the BS transmits one codeword to the UE, but Table 12-3 may be similarly applied to a case where the BS transmits two or more codewords to the UE.

Table 12-4 shows a case where maxLength=2 that is different in DMRS type 2 described in Table 12-3. Referring to Table 7 to Table 8, in DMRS port configuration for C-JT/NC-JT, 2 to 4 DMRS ports are allocated, and at least one DMRS port is allocated to each CDM group. According to the number of front-load symbols, when the number of front-load symbols is 1, DMRS ports from among DMRS ports 0-3 are allocated (the same as Table 14 and thus skipped), and when the number of front-load symbols is 2, DMRS ports from among DMRS ports 0-7 are allocated. When two DMRS ports are used, a frequency domain orthogonal cover code (OCC) of each CDM group has to be equal. The time domain OCCs of respective CDM groups may be equal or different. For example, in respective CDM groups {0,1}, DMRS ports 0 and 2 that use a same time domain NCC may be simultaneously used, and DMRS ports 0 and 6 that use different time domain OCCs may be simultaneously used. When three or more DMRS ports are used, a time domain OCC to be applied to each of CDM groups {0,1} may be equal or vary. The embodiments are in an entry form, and all or some of 28 entries may be applied to an actual system. For example, Table for some of the entries may be determined by using only entries 0, 2, 3, 6, 7, 9, 10, and 13 or entries 0, 2, 3, 6, 7, 9, 10, 13, 14, 16, 17, 20, 23, 24, and 27. In the above embodiment of the disclosure, an order of entries is merely an example and thus the disclosure is not limited thereto. With respect to Table 12-4, it is assumed that the BS transmits one codeword to the UE, but Table 12-4 may be similarly applied to a case where the BS transmits two or more codewords to the UE.

TABLE 12-1

DMRS indication table for antenna port(s)
(1000 + DMRS port), dmrs-Type = 1, maxLength = 1
One Codeword (dmrs-Type = 1, maxLength = 1)

| Entries | Number of DMRS CDM group(s) without data | DMRS port(s) | Number of front-load symbols |
|---|---|---|---|
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |

TABLE 12-2

DMRS indication table for antenna port(s)
(1000 + DMRS port), dmrs-Type = 1, maxLength = 2
One Codeword (dmrs-Type = 1, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |

TABLE 12-3

DMRS indication table for antenna port(s)
(1000 + DMRS port), dmrs-Type = 2, maxLength = 1
One Codeword (dmrs-Type = 2, maxLength = 1)

| Entries | Number of DMRS CDM group(s) without data | DMRS port(s) | Number of front-load symbols |
|---|---|---|---|
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |
| 7 | 3 | 0; 2 | 1 |
| 8 | 3 | 1; 3 | 1 |
| 9 | 3 | 0, 1; 2 | 1 |
| 10 | 3 | 0; 2, 3 | 1 |
| 11 | 3 | 1; 2, 3 | 1 |
| 12 | 3 | 0, 1; 3 | 1 |
| 13 | 3 | 0, 1; 2, 3 | 1 |

TABLE 12-4

DMRS indication table for antenna port(s)
(1000 + DMRS port), dmrs-Type = 2, maxLength = 2
One Codeword (dmrs-Type = 2, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |
| 7 | 3 | 0; 2 | 2 |
| 8 | 3 | 1; 3 | 2 |
| 9 | 3 | 0, 1; 2 | 2 |
| 10 | 3 | 0; 2, 3 | 2 |
| 11 | 3 | 1; 2, 3 | 2 |
| 12 | 3 | 0, 1; 3 | 2 |
| 13 | 3 | 0, 1; 2, 3 | 2 |
| 14 | 2 | 6; 8 | 2 |
| 15 | 2 | 7; 9 | 2 |
| 16 | 2 | 6, 7; 8 | 2 |
| 17 | 2 | 6, 8; 9 | 2 |
| 18 | 2 | 7; 8, 9 | 2 |
| 19 | 2 | 6; 7, 9 | 2 |
| 20 | 2 | 6, 7; 8, 9 | 2 |
| 21 | 3 | 6; 8 | 2 |
| 22 | 3 | 7; 9 | 2 |
| 23 | 3 | 6, 7; 8 | 2 |
| 24 | 3 | 6, 8; 9 | 2 |
| 25 | 3 | 7; 8, 9 | 2 |
| 26 | 3 | 6; 7, 9 | 2 |
| 27 | 3 | 6, 7; 8, 9 | 2 |

Second Embodiment

In Table 13-1, a method using code points of reserved bits in existing NR Rel-15 specification is provided, as a method by which the BS indicates, to the UE, a DMRS port for C-JT/NC-JT transmission. As in Table 7, DMRS Table of NR Rel-15 specification uses fields of 0 to 11 and, fields of 12 to 15 are reserved bits and thus have not been used. In an embodiment of the disclosure, DMRS ports for cooperative transmission of transmission at two TRPs may be indicated by using four code points of 12 to 15 in DMRS Table of Table 13-1. In a case where DMRS ports for C-JT/NC-JT are indicated by using same reserved bits, the BS and the UE do not need to assign a separate field and thus a DCI resource may be further efficiently used.

For example, when the BS indicates entry 12 to the UE, the UE may determine that the BS transmits DMRS port 0 and DMRS port 2 at the first TRP and the second TRP. When the UE checks that the number of each of DMRS ports is 1, the UE may determine that single-layer transmission is to be performed at the first TRP and the second TRP. As another example, when the BS indicates entry 13 to the UE, the UE may determine that the BS transmits DMRS port 0 and DMRS port 1 at the first TRP, and transmits DMRS port 2 at the second TRP. When the UE checks that the number of each of DMRS ports is 2 and 1, the UE may determine that double-layer transmission is to be performed at the first TRP and single-layer transmission is to be performed at the second TRP. As another example, when the BS indicates entry 14 to the UE, the UE may determine that the BS transmits DMRS port 0 at the first TRP, and transmits DMRS port 2 and DMRS port 3 at the second TRP. When the UE checks that the number of each of DMRS ports is 1 and 2, the UE may determine that single-layer transmission is to be performed at the first TRP and double-layer transmission is to be performed at the second TRP. As another example, when the BS indicates entry 15 to the UE, the UE may determine that the BS transmits DMRS port 0 and DMRS port 1 at the first TRP, and transmits DMRS port 2 and DMRS port 3 at the second TRP. When the UE checks that the number of each of DMRS ports is 2, the UE may determine that double-layer transmission is to be performed at the first TRP and double-layer transmission is to be performed at the second TRP.

In this regard, the UE whose upper layer being configured with C-JT/NC-JT transmission may determine in a dynamic manner whether to perform C-JT/NC-JT transmission by checking remaining code points of existing antenna port fields in DCI format 1_1. That is, when antenna port fields in DCI format 1_1 are 12 to 15, the UE may check, in DCI, the number of TRPs to be used in transmission of a scheduled PDSCH, the number of layers to be transmitted, the number of DMRS DCM groups without data, the number of front-loaded symbols, or the like. The aforementioned embodiments are in an entry form, and all or some of 4 entries may be applied to an actual system. In the above embodiment of the disclosure, an order of entries is merely an example and thus the disclosure is not limited thereto.

For example, Table 13-2 to Table 13-4 correspond to an embodiment in which some of DMRS ports separately generated in Table 12-2 to Table 12-4 are added Table 8 to Table 10 defined in NR Rel-15 specification, and in order to decrease a size of bits, overlapping DMRS ports may be skipped. The skip is merely an example, and some or all of DMRS ports shown in Table 12-1 to Table 12-4 may be added and used. Also, the BS may schedule joint transmission as in Tables 12 and 13 to a NC-JT UE of NR Rel-16 specification and may simultaneously schedule single port transmission to a UE of NR Rel-15 specification with respect to a same DMRS port, such that a DL MU-MIMO may be performed.

As another example, when a DMRS port index is same in some entries of Table 13-1 to Table 13-4, overlapping indices may be skipped. That is, in Table 13-1, entries 12, 13, and 15 for NC-JT transmission have same port indices as those of entries 11, 9, and 10 and thus the same port indices may be skipped. Also, in Table 13-2, entries 31, 32, and 34 for NC-JT transmission have same port indices as those of entries 11, 9, and 10 and thus the same port indices may be skipped. Also, in Table 13-3, entries 24, 25, 27, 29, and 31 for NC-JT transmission have same port indices as those of entries 23, 9, 10, 29, and 22 and thus the same port indices may be skipped. Also, in Table 13-4, entries 58, 59, 61, 63, and 65 for NC-JT transmission have same port indices as those of entries 23, 9, 10, 20, and 22 and thus the same port indices may be skipped. Overlapping indices may be skipped based on one of assumption that different CDM groups are not transmitted for NC-JT in a same port, assumption that a TCI field indicates whether NC-JT is to be performed and thus the UE can identify a DMRS port for NC-JT, and assumption that a DMRS port can be identified based on reception of a MAC CE message and reception of DCI.

TABLE 13-1

DMRS indication table for antenna port(s)
(1000 + DMRS port), dmrs-Type = 1, maxLength = 1
One Codeword:
Codeword 0 enabled,
Codeword 3 disabled

| Entry | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0; 2 |
| 13 | 2 | 0, 1; 2 |
| 14 | 2 | 0, 2, 3 |
| 15 | 2 | 0, 1; 2, 3 |

TABLE 13-2

DMRS indication table for antenna port(s)
(1000 + DMRS port), dmrs-Type = 1, maxLength = 2
One Codeword:
Codeword 0 enabled,
Codeword 1 disabled

| Entry | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | 2 | 0; 2 | 1 |
| 32 | 2 | 0, 1; 2 | 1 |
| 33 | 2 | 0; 2, 3 | 1 |
| 34 | 2 | 0, 1; 2, 3 | 1 |
| 35 | 2 | 0; 2 | 2 |
| 36 | 2 | 0, 1; 2 | 2 |

TABLE 13-2-continued

DMRS indication table for antenna port(s)
(1000 + DMRS port), dmrs-Type = 1, maxLength = 2
One Codeword:
Codeword 0 enabled,
Codeword 1 disabled

| Entry | Number of DMRS CDM group(s) without data | DMRS port(s) | Number of front-load symbols |
|---|---|---|---|
| 37 | 2 | 0; 2, 3 | 2 |
| 38 | 2 | 0, 1; 2, 3 | 2 |
| 39 | Reserved | Reserved | Reserved |

TABLE 13-3

DMRS indication table for antenna port(s)
(1000 + DMRS port), dmrs-Type = 2, maxLength = 1
One codeword:
Codeword 0 enabled;
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 3 | 0, 2 |
| 24 | 2 | 0; 2 |
| 25 | 2 | 0, 1; 2 |
| 26 | 2 | 0; 2, 3 |
| 27 | 2 | 0, 1; 2, 3 |
| 28 | 3 | 0; 2 |
| 29 | 3 | 0, 1; 2 |
| 30 | 3 | 0; 2, 3 |
| 31 | 3 | 0, 1; 2, 3 |

TABLE 13-4

DMRS indication table for antenna port(s) (1000 + DMRS port), dmrs-Type = 2, maxLength = 2
One codeword:
Codeword 0 enabled,
Codeword 1 disabled

| Value | Number of DMRS CDM groups(s) without data | DMRS port(s) | Number of front-load symbols | Value | Number of DMRS CDM group(s) without data | DMRS port(s) | Number of front-load symbols |
|---|---|---|---|---|---|---|---|
| 0 | 1 | 0 | 1 | 48 | 1 | 0 | 2 |
| 1 | 1 | 1 | 1 | 49 | 1 | 1 | 2 |
| 2 | 1 | 0, 1 | 1 | 50 | 1 | 6 | 2 |
| 3 | 2 | 0 | 1 | 51 | 1 | 7 | 2 |
| 4 | 2 | 1 | 1 | 52 | 1 | 0, 1 | 2 |
| 5 | 2 | 2 | 1 | 53 | 1 | 6, 7 | 2 |
| 6 | 2 | 3 | 1 | 54 | 2 | 0, 1 | 2 |
| 7 | 2 | 0, 1 | 1 | 55 | 2 | 2, 3 | 2 |
| 8 | 2 | 2, 3 | 1 | 56 | 2 | 6, 7 | 2 |
| 9 | 2 | 0-2 | 1 | 57 | 2 | 8, 9 | 2 |
| 10 | 2 | 0-3 | 1 | 58 | 2 | 0; 2 | 1 |
| 11 | 3 | 0 | 1 | 59 | 2 | 0, 1; 2 | 1 |
| 12 | 3 | 1 | 1 | 60 | 2 | 0; 2, 3 | 1 |
| 13 | 3 | 2 | 1 | 61 | 2 | 0, 1; 2, 3 | 1 |
| 14 | 3 | 3 | 1 | 62 | 3 | 0; 2 | 1 |
| 15 | 3 | 4 | 1 | 63 | 3 | 0, 1; 2 | 1 |
| 16 | 3 | 5 | 1 | 64 | 3 | 0; 2; 3 | 1 |
| 17 | 3 | 0, 1 | 1 | 65 | 3 | 0, 1; 2, 3 | 1 |
| 18 | 3 | 2, 3 | 1 | 66 | 2 | 0; 2 | 2 |
| 19 | 3 | 4, 5 | 1 | 67 | 2 | 0, 1; 2 | 2 |
| 20 | 3 | 0-2 | 1 | 68 | 2 | 0, 2; 3 | 2 |
| 21 | 3 | 3-5 | 1 | 69 | 2 | 0, 1, 2, 3 | 2 |
| 22 | 3 | 0-3 | 1 | 70 | 3 | 0, 2 | 2 |
| 23 | 2 | 0, 2 | 1 | 71 | 3 | 0, 1; 2 | 2 |
| 24 | 3 | 0 | 2 | 72 | 3 | 0; 2, 3 | 2 |
| 25 | 3 | 1 | 2 | 73 | 3 | 0, 1; 2, 3 | 2 |
| 26 | 3 | 2 | 2 | 74-127 | reserved | reserved | reserved |
| 27 | 3 | 3 | 2 | | | | |

TABLE 13-4-continued

DMRS indication table for antenna port(s) (1000 + DMRS port), dmrs-Type = 2, maxLength = 2
One codeword:
Codeword 0 enabled,
Codeword 1 disabled

| Value | Number of DMRS CDM groups(s) without data | DMRS port(s) | Number of front-load symbols | Value | Number of DMRS CDM group(s) without data | DMRS port(s) | Number of front-load symbols |
|---|---|---|---|---|---|---|---|
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |

The UE may support data in a C-JT or NC-JT manner, the data being transmitted from multiple TRPs or a plurality of BSs. The UE that supports C-JT/NC-JT may receive C-JT/NC-JT related parameters or setting values via upper layer configuration, and based on the same, the UE may set an RRC parameter of the UE. For the upper layer configuration, the UE may use UE capability parameter tci-StatePDSCH. In this regard, the UE capability parameter tci-StatePDSCH defines TCI states to transmit a PDSCH. The number of TCI states may be configured to be 4, 8, 16, 32, 64, and 128 in FR1, and 64 and 128 in FR2. Maximum 8 states that can be indicated by 3 bits of a TCI field of DCI may be configured based on the configured number via a MAC CE message. A largest value of 128 corresponds to a value indicated by maxNumberConfiguredTCIstatesPerCC in a tci-StatePDSCH parameter included in UE capability signaling. In this manner, a series of configuration including upper layer configuration and MAC CE configuration may be applied to beamforming indication or a beamforming change command for at least one PDSCH at one TRP.

Various embodiments of the disclosure provide how the BS can allow the UE to activate or deactivate a TCI state via MAC CE signaling being different in NR Rel-15 specification and NR Rel-16 specification. In particular, when the BS allocates a PDSCH to a particular UE, the BS may dynamically support beamforming direction indication or a beamforming direction change command by using a TCI field of DCI format 1_1.

The beamforming direction indication or the beamforming direction change command refers to an operation to be applied to when the UE receives a PDSCH in a DL after the UE checks TCI states field information in DCI format 1_1 and then a preset time period is elapsed. In this regard, a direction means a beamforming configuration direction associated with a DL RS of QCLed BS/TRP.

First, the BS or the UE may determine to use a NR Rel-15 specification MAC CE for a NR Rel-15 specification DCI format and use a NR Rel-16 specification MAC CE for a NR Rel-16 specification DCI format. According to a method by which a MAC CE structure of NR Rel-15 specification and a MAC CE structure of NR Rel-16 specification are distinguished therebetween, different solutions are provided.

1-1 Embodiment

A NR Rel-16 specification MAC CE may be configured by partially extending a NR Rel-15 specification MAC CE message. The present embodiment of the disclosure may be provided in such a manner that all TCI states activated by the NR Rel-15 specification MAC CE are to be included in TCI states activated by the NR Rel-16 specification MAC CE.

Figure 11:
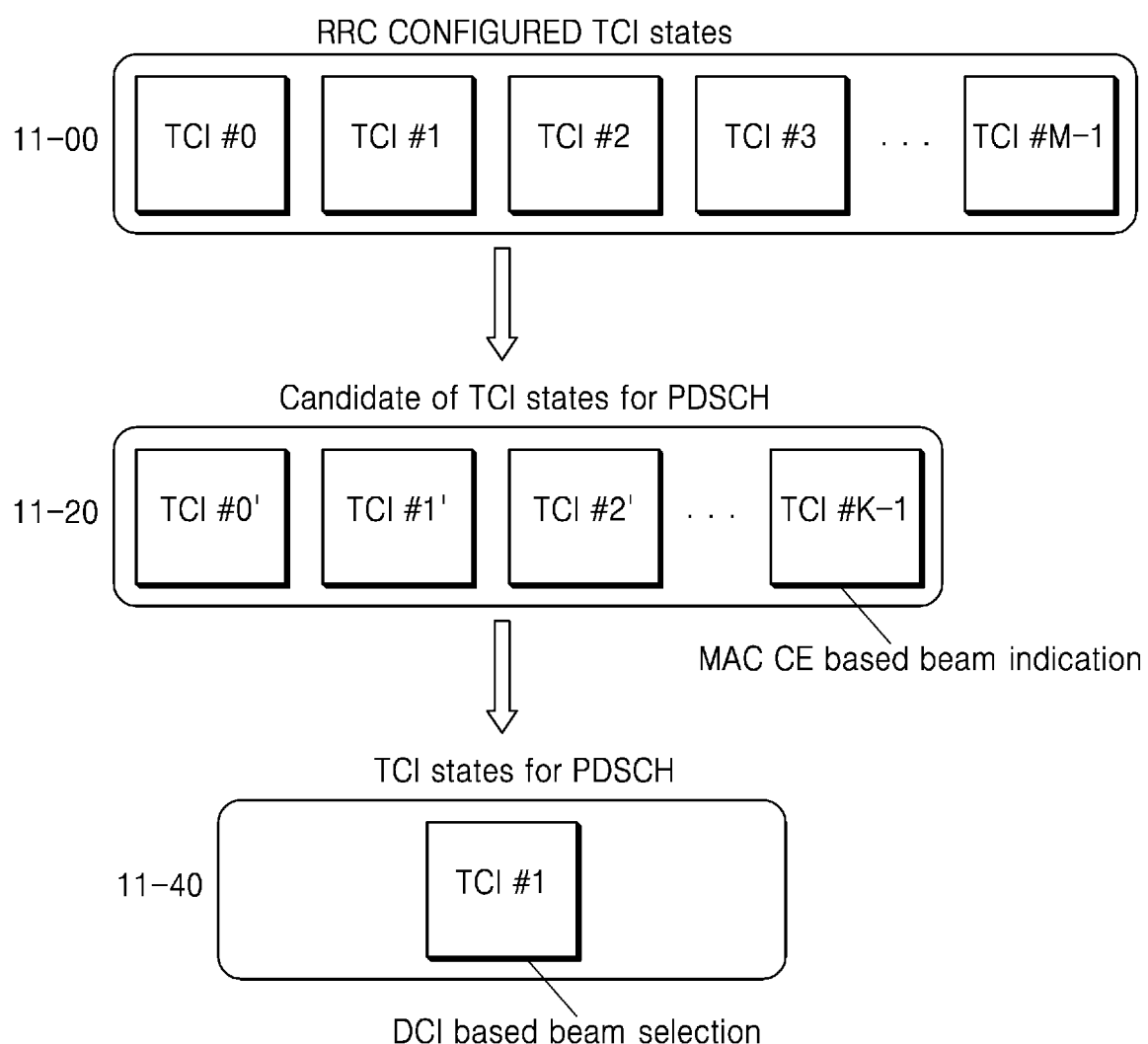
FIG. 11 illustrates an example of transmission configuration indication (TCI) states configuration and indication according to an embodiment of the disclosure.

For example, as shown in FIG. 11, the BS may determine all TCI states of RRC configured TCI states 11-00 of NR Rel-15 specification to be M as TCI #0, TCI #1, TCI #2, . . . , TCI #M−1, and may select, from among M TCI states, TCI #0', TCI #1', TCI #2', . . . , TCI #K−1 as a subset 11-20 of TCI states selected based on the NR Rel-15 specification MAC CE. On the other hand, the BS and the UE that support NR Rel-16 specification may separately configure RRC configured TCI states supporting NR Rel-16 specification, or may changelessly use RRC configured TCI states configured based on NR Rel-15 specification. In this regard, the RRC configured TCI states supporting NR Rel-16 specification may include some or all of the RRC configured TCI states configured based on NR Rel-15 specification. When M=128, TCI states of NR Rel-16 specification may be equal to or greater than 128. In a case where the BS or the UE increases the number of TCI states supported by NR Rel-15 specification in proportion to the number of BSs/TRPs that operate in C-JT/NC-JT in NR Rel-16 specification, when two TRPs operate, maximum 256 TCI states may be configured. In this regard, the NR Rel-16 specification MAC CE may include, in RRC configured TCI states for NR Rel-16 specification, some or all of TCI states supported by the NR Rel-15 specification MAC CE. In detail, in a case where the NR Rel-16 specification MAC CE includes all TCI states supported by the NR Rel-15 specification MAC CE and the number of TCI states is increased in proportion to the number of BSs/TRPs operating in C-JT/NC-JT in NR Rel-16 specification, when two TRPs operate, maximum 2K TCI states may be configured.

Table 14 shows details of the tci-StatePDSCH parameter described in the embodiment of the disclosure. In particular, a FR2 mandatory value of a maxNumberConfiguredTCIstatesPerCC parameter may be changed from 64 to 128 or 256 or may be separately added as 64, 128, or 256 for the purpose of C-JT/NC-JT.

is configured as 8, the BS may indicate selection of a beam for a PDSCH to the UE via DCI-based beam selection in one CORESET. Beam selection may be determined from among maximum 8 values by checking TCI field information 11-40 in DCI. TCI field #I indicated in FIG. 11 may be selected as a value of 0 to 7. For example, when a TCI field in the DCI is indicated as 000, the UE may determine that TCI #0'(TCI #I=TCI #0') is indicated from among TCI #0', TCI #1', TCI #2', TCI #3', TCI #4', TCI #5', TCI #6', and TCI #7'. The above embodiment of the disclosure is described with reference to a case where a maximum value is each 8 (K=8),

TABLE 14

Details of tci-StatePDSCH parameter

| Definitions for parameters | Per | M | FDD-TOD DIFF | FR1-FR2 DIFF |
|---|---|---|---|---|
| tci-StatePDSCH<br>Defines support of TCI-States for PDSCH. The capability signalling comprises the following parameters:<br>maxNumberConfiguredTCIstatesPerCC indicates the maximum number of configured TCI-states per CC for PDSCH. For FR2, the UE is mandated to set the value to 128. For FR1, the UE is mandated to set these values to the maximum number of allowed SSSs in the supported band.<br>maxNumberActiveTCI-PerBWP indicates the maximum number of activated TCI-states per BWP per CC, including control and data. If a UE reports X active TCI state (s), It is not expected that more than X active Q CL type D assumption (s) for any PDSCH and any CORESETs for a given BWP of a serving cell become active for the UE. | Band | Yes | NO | No |

Note
the UE is required to track only the active TCI states.

1-2 Embodiment

The BS or the UE which supports NR Rel-15 specification and NR Rel-16 specification may configure a maximum value for NR Rel-15 specification and NR Rel-16 specification so as to configure TCI states via a MAC CE, and then may configure the number of TCI states to be equal to or smaller than the configured maximum value. As a method of configuring the number of TCI states to be equal to or smaller than a maximum value, various embodiments of the disclosure may be provided below.

The number of TCI states to be activated in response to MAC CE messages of NR Rel-15 specification and NR Rel-16 specification may be configured based on a UE capability value reported by the UE. As another example, the number of TCI states to be activated in response to MAC CE messages of NR Rel-15 specification and NR Rel-16 specification may be determined to be a value preset by the BS. As another example, the number of TCI states to be activated in response to MAC CE messages of NR Rel-15 specification and NR Rel-16 specification may be determined to be a value that is pre-agreed between the BS and the UE.

For example, as shown in FIG. 11, the BS and the UE may determine all TCI states of RRC configured TCI states 11-00 of NR Rel-15 specification to be M as TCI #0, TCI #1, TCI #2, . . . , TCI #M−1, and may array, from among M TCI states, TCI #0', TCI #1', TCI #2', . . . , TCI #K−1 as a subset 11-20 of TCI states selected based on the NR Rel-15 specification MAC CE. When TCI #0 is selected from TCI states, TCI #0 may be arrayed at TCI #0'. In this regard, for example, a maximum value of K value for the BS and the UE supporting NR Rel-15 specification may be configured or determined as 8, and a maximum value of K value for the BS and the UE supporting NR Rel-16 specification may also be configured or determined as 8. When the maximum value but the maximum value may be configured as a value that is smaller than 8. The above embodiment of the disclosure is described with reference to a case where a maximum value K for the NR Rel-15 specification MAC CE and a maximum value K for the NR Rel-16 specification MAC CE are equal, but the maximum values K may be configured as different values.

As another example, in a case where the number of TCI states is increased in proportion to the number of BSs/TRPs operating in C-JT/NC-JT, when two TRPs operate, a maximum value K for the BS and the UE that support NR Rel-16 specification may be configured as 16. When the maximum value is configured as 16, the BS may indicate selection of one or more beams for a PDSCH to the UE via DCI-based beam selection in one CORESET. When K=16, #I selected and indicated by the BS may be selected as a value between 0 to 15. The above embodiment of the disclosure is described with reference to a case where a maximum value is each 16 (K=16), but the maximum value may be configured as a value that is smaller than 16.

Next, the BS or the UE may determine to use only NR Rel-16 specification MAC CE signaling. That is, the NR Rel-15 specification MAC CE and the NR Rel-16 specification MAC CE may use integrated one NR Rel-16 specification MAC CE for C-JT/NC-JT. A present embodiment of the disclosure provides a method of using a NR Rel-16 specification MAC CE for DCI format supported by the existing NR Rel-15 specification, when the BS or the UE determines to signal only NR Rel-16 specification MAC CE.

2-1 Embodiment

In a case where the UE is scheduled according to DCI based on NR Rel-15 specification, when TCI code points in the DCI are associated with two or more TCI states, the UE may consider only a first TCI state from among the two or more TCI states. When NR Rel-15 specification UE and NR Rel-16 specification UE are signaled via a MAC CE that is integrated or compatible, the NR Rel-15 specification UE can perform an operation in a similar manner to an operation of obtaining desired information by receiving a NR Rel-15 specification MAC CE defined in the current standard. On the other hand, the NR Rel-16 specification UE may determine that at least one TCI state is to be selected from among the two or more TCI states selected according to the DCI, based on transmission determination by the BS. The UE may determine a transmission determination method of the BS based on at least one of information about the number of antenna ports in the DCI, information about an indicated DMRS port in a DMRS table, or TCI index information.

Figure 12:
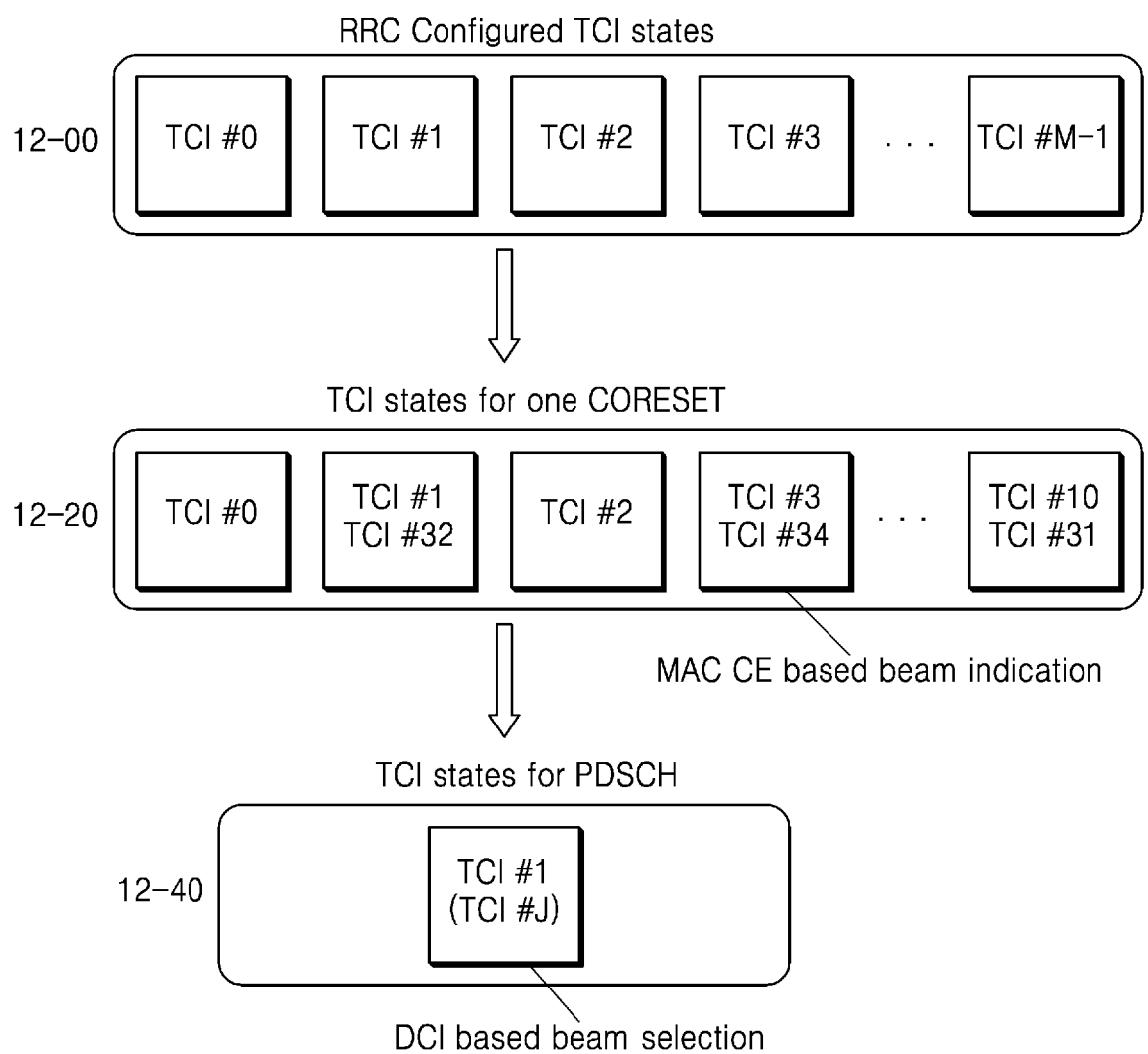
FIG. 12 illustrates an example of TCI states configuration and indication according to another embodiment of the disclosure.

For example, as shown in FIG. 12, the BS may determine all TCI states 12-00 of RRC configured TCI states of NR Rel-15 specification to be M TCI states such as TCI #0, TCI #1, TCI #2, . . . , TCI #M−1, and one TCI states group or at least one TCI states group for C-JT/NC-JT from among the M TCI states may be configured as a MAC CE 12-20. The MAC CE 12-20 may be configured in a complex manner by including one TCI state information and at least two pieces of TCI state information for C-JT/NC-JT. For example, in the configuration, one piece of TCI state information may be arrayed at the front, two pieces of TCI state information may be arrayed thereafter, and then more pieces of TCI state information may be arrayed thereafter. As another example according to an array order, TCI state whose index is smallest is arrayed at the front, such that TCI states may be arranged in order of TCI #0, (TCI #1, TCI #32), TCI #2, (TCI #3, TCI #34), . . . , (TCI #10, TCI #31). When the UE receives the MAC CE, the UE may determine that TCI #I or one of (TCI #1, TCI #J) is indicated (12-40) based on DCI-based beam selection information in the DCI. When TCI #I is indicated in the example above, the UE may determine that one beamforming direction is selected. In detail, when TCI #0 is indicated, the UE may perform beamforming in a beam direction mapped to TCI #0. Also, in an embodiment of the disclosure, when (TCI #I, TCI #J) are indicated, the NR Rel-15 specification UE may determine that TCI #I that is a first index in two beamforming directions is selected. In detail, when (TCI #1, TCI #32) are indicated, the UE may perform beamforming at a first TRP in a beam direction mapped to TCI #1. Also, in an embodiment of the disclosure, when (TCI #1, TCI #J) are indicated, the NR Rel-16 specification UE may determine that two beamforming directions are selected. In detail, when (TCI #1, TCI #32) are indicated, the UE may perform beamforming at a first TRP in a beam direction mapped to TCI #1, and may perform beamforming at a second TRP in a beam direction mapped to TCI #32.

That is, when the UE is the NR Rel-15 specification UE, the UE may interpret, from information obtained from the MAC CE, only TCI #I that is information about a first TCI state and may determine single transmission of transmission at one TRP. On the other hand, when the UE is the NR Rel-16 specification UE, the UE may interpret some or all of information of the MAC CE that is indexed and obtained. When a TRP for C-JT/NC-JT transmission is configured as 2 for the UE, the UE may interpret all of TCI #I, TCI #J) that are TCI state information and thus may determine that two beams are selected. In the above embodiment of the disclosure, when a TRP for C-JT/NC-JT transmission is configured as 3 for the UE, TCI states such as (TCI #I, TCI #J, TCI #L) may be additionally added to the MAC CE.

2-2 Embodiment

In a case where the UE is scheduled according to DCI based on NR Rel-15 specification, when TCI code points in the DCI are associated with two or more TCI states, the UE may consider only smallest TCI state ID from among the two or more TCI states.

For example, as shown in FIG. 12, the BS may determine all TCI states 12-00 of RRC configured TCI states of NR Rel-15 specification to be M TCI states such as TCI #0, TCI #1, TCI #2, . . . , TCI #M−1, and one TCI states group or at least one TCI states group for C-JT/NC-JT from among the M TCI states may be configured as a MAC CE 12-20. The MAC CE 12-20 may be configured in a complex manner by including one TCI state information and at least two pieces of TCI state information for C-JT/NC-JT. For example, in the configuration, one piece of TCI state information may be arrayed at the front, two pieces of TCI state information may be arrayed thereafter, and then more pieces of TCI state information may be arrayed thereafter. As another example, in the configuration, a smaller TCI state index is arrayed at the front, based on a smallest value among TCI state indices, such that TCI states may be arranged in order of TCI #0, (TCI #32, TCI #1), TCI #2, (TCI #34, TCI #3), . . . , (TCI #10, TCI #31). When the UE receives the MAC CE, the UE may determine that TCI #1 or one of (TCI #I, TCI #J) is indicated (12-40) based on DCI-based beam selection information in the DCI.

When TCI #I is indicated in the example above, the UE may determine that one beamforming direction is selected. In detail, when TCI #0 is indicated, the UE may perform beamforming in a beam direction mapped to TCI #0. Also, in an embodiment of the disclosure, when (TCI #I, TCI #J) are indicated, the NR Rel-15 specification UE may interpret that TCI #I (I<J) is selected from among two beamforming directions, in consideration of a smallest TCI state ID. In detail, when (TCI #32, TCI #1) are indicated, the UE may perform beamforming at a first TRP in a beam direction mapped to TCI #1. Also, in an embodiment of the disclosure, when (TCI #I, TCI #J) are indicated, the NR Rel-16 specification UE may determine that two beamforming directions are selected. In detail, when (TCI #32, TCI #1) are indicated, the UE may perform beamforming at a first TRP in a beam direction mapped to TCI #1, and may perform beamforming at a second TRP in a beam direction mapped to TCI #32. In the above embodiment of the disclosure, when a TRP for C-JT/NC-JT transmission is configured as 3 for the UE, TCI states such as (TCI #I, TCI #J, TCI #L) may be additionally added to the MAC CE.

FIG. 13 illustrates a structure of a MAC CE message for indication of TCI states. FIG. 13 illustrates the structure of the MAC CE message to be transmitted from the BS to the UE when the BS selects K TCI states (11-20) from M TCI states 11-00 of FIG. 11 and attempts to indicate the selection to the UE. The MAC CE message may include Serving Cell ID (e.g., 5 bits) and BWP ID (e.g., 2 bits) information configured for communication between the BS and the UE. Also, the MAC CE message requires M bits to indicate activation or deactivation of each of M TCI states by using 1-bit indication. M bits may be arrayed by using resources in an Octet form as shown in FIG. 13. Indices T0, T1, . . . , T(N−2)×8−7 indicate respective TCI states, and in order to indicate a total of M bits, M is configured to be a value equal to or greater than T(N−2)×8 and equal to or smaller than T(N−2)×8−7. For example, in order to indicate TCI states to be activated from among 128 TCI states, the MAC CE message requires a total of 17 Octet(N=17) resources including Oct 1 for configured Serving Cell ID and BWP ID. In this regard, when 8 TCI states from T0 to T7 are activated, 1 is indicated at locations corresponding to T0 to T7 resources in the MAC CE message and other T8 to T127 are indicated as 0. The locations of the resources indicated as 1 to indicate activation of the TCI states are mapped for the UE to determine activated directions of beamforming when the UE receives the MAC CE and then succeeds in decoding the MAC CE.

For convenience of description, a format of the MAC CE shown in FIG. 13 is called MAC CE format A in descriptions below.

In order for the NR Rel-15 specification UE and the NR Rel-16 specification UE to operate in one integrated TCI state as in 2-1 and 2-2 embodiments, a MAC CE structure for a TCT state has to be changed. To this end, the present embodiment of the disclosure provides a new structure of a MAC CE message.

3-1 Embodiment

Figure 14A:
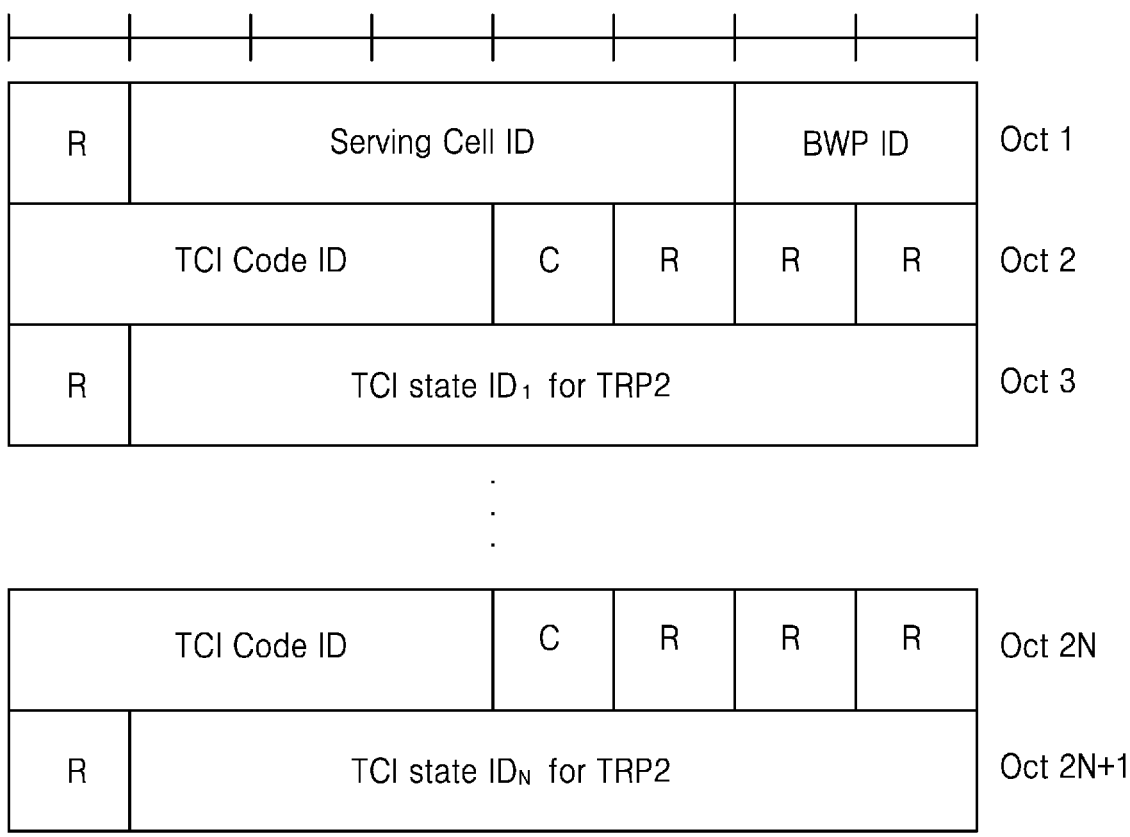
FIG. 14A illustrates a structure of a MAC CE message for coherent joint transmission (C-JT)/non-coherent joint transmission (NC-JT) transmission according to an embodiment of the disclosure.

FIG. 14A illustrates a structure of a MAC CE message for C-JT/NC-JT transmission according to an embodiment of the disclosure.

In the present embodiment of the disclosure, it is assumed that two TRPs exist and N TCI Code IDs exist.

The MAC CE message according to an embodiment of the disclosure may include existing BWP ID and Serving cell ID information and may additionally include at least one TCI code ID and TCI states ID 1 of a second TRP associated with the TCI code ID. As shown in FIG. 14A, TCI code ID in Oct 2 is associated with TCI states ID 1 of the second TRP in Oct 3. In this regard, the TCI code ID may include a 4-bit (0000 to 1111) resource or a 3-bit (000 to 111) resource. The TCI code ID refers to an indicator that is a value mapped to a TCI field of DCI 1_1 and indicates a beamforming direction of a first TRP configured with reference to FIG. 13. Also, TCI states ID N of the second TRP refers to indices of TCI states that are activated as 1 from among M TCI states of FIG. 13. A resource size of the TCI states ID N of the second TRP may require a resource of maximum 7 bits to indicate all of 128 TCI states. In a case where maximum 256 TCI states are configured for C-JT/NC-JT transmission, in order to indicate the maximum number, a resource size of the TCI states ID N of the second TRP may require 8 bits. For example, in a case where the UE receives a MAC CE message where BWP ID is 00, Serving Cell ID is 00100, TCI code ID is 1101, and the TCI states ID N of the second TRP is 1000000, when a beamforming configuration value of a TCI field of DCI 1_1 is indicated as 1101 in a BWP configured as default in a current serving cell (00100), the UE may determine that an activated beam direction of 13 from among 128 TCI states at the first TRP and an activated beam direction of 64 from among 128 TCI states at the second TRP are associated with each other.

Figure 14B:
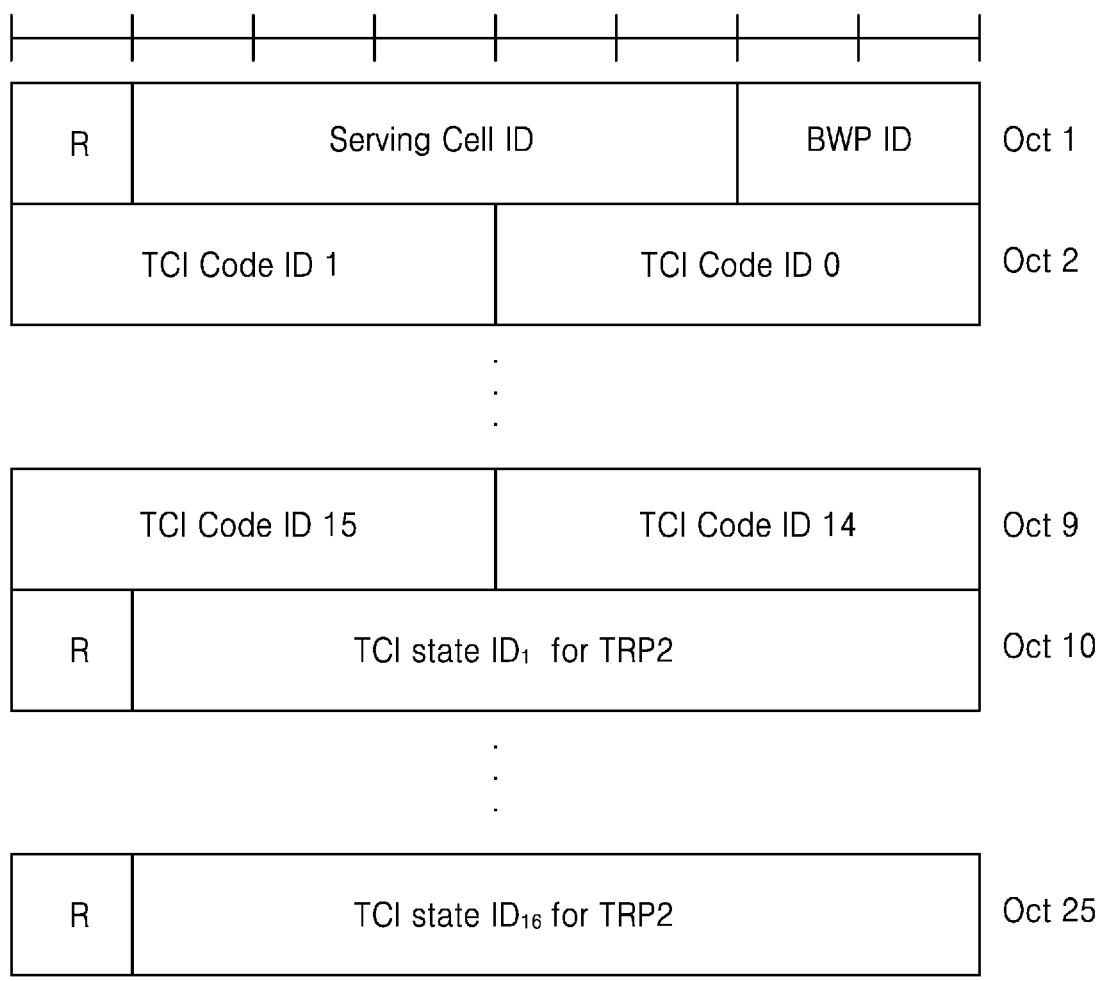
FIG. 14B illustrates a structure of a MAC CE message for C-JT/NC-JT transmission according to another embodiment of the disclosure.

FIG. 14B illustrates a structure of a MAC CE message for C-JT/NC-JT transmission according to another embodiment of the disclosure.

Referring to FIG. 14B, for resource efficiency, one or more TCI code IDs may be first arrayed and then TCI states ID N (N=16) of the second TRP may be arrayed. In this regard, in a case where the MAC CE message indicates 16 TCI code IDs requiring 4 bits and 16 TCI states IDs for the second TRP, when the MAC CE message is configured in a manner shown in FIG. 14A, a total of 33 Octet resources (N=16) are required. However, when the MAC CE message is configured in a manner shown in FIG. 14B, only 25 Octet resources are required and thus the configuration of the MAC CE message shown in FIG. 14B may be better in terms of resource efficiency.

In another embodiment of the disclosure, when the MAC CE message of FIG. 13 and the MAC CE message of FIG. 14A or FIG. 14B are configured as one MAC CE message, serving cell ID and BWP ID that are repeated may be skipped, and Oct 1 of FIG. 14A or FIG. 14B may be successively arrayed after Oct N of FIG. 13. As such, when separate messages are configured as one message, the BS may simultaneously indicate configuration of TCI states and configuration of C-JT/NC-JT transmission by transmitting a PDSCH one time, such that latency due to configuration may be decreased and efficiency of a MAC CE resource may be increased.

3-2 Embodiment

FIG. 15A illustrates a structure of a MAC CE message for C-JT/NC-JT transmission according to an embodiment of the disclosure.

In the present embodiment of the disclosure, it is assumed that two TRPs are configured for C-JT/NC-JT transmission, a total of 128 TCI states are configured, and N TCI Code IDs (e.g., N=16) are configured. A newly provided MAC CE message may be configured by successively arraying existing BWP ID and Serving cell ID information and then a plurality of pieces of TCI state ID pair information corresponding to the number (16) of TCI code IDs. In the present embodiment of the disclosure, TCI code point used in the MAC CE message of 3-1 Embodiment is omitted, but instead, TCI state ID pairs are arrayed in an inherent order, and upon receipt of the MAC CE message, the UE may determine indication and a change with respect to beamforming for C-JT/NC-JT reception. In this regard, TCI state ID 1 is an TCI states index for configuring indication and a change with respect to beamforming of the first TRP, and TCI state ID 2 is an TCI states index for configuring indication and a change with respect to beamforming of the second TRP. In the embodiment of the disclosure, TCI states T0 to T(N−2)×8+7 are arrayed as TCI states T(N−2)×8+7 regardless of identification and order with respect to TRPs, and TCI states IDs for first and second TRPs are arrayed as a pair. For example, in a case where the UE receives a MAC CE message where BWP ID is 00, Serving Cell ID is 00100, TCI states activated for the first TRP are T0 to T7 (T0=T1=T2=T3=T4=T5=T6=T7=1), TCI states activated for the second TRP are T24 to T31 (T24=T25=T26=T27=T28=T29=T30=T31=1), TCI states ID 1 of the first TRP is 0000000, TCI states ID 1 of the second TRP is 0010000, TCI states ID 2 of the first TRP is 000001, TCI states ID 2 of the second TRP is 0010-001 . . . , TCI states ID 16 of the first TRP is 0001000, TCI states ID 16 of the second TRP is 0011000, when TCI code point 0 is indicated, the UE may determine that a pair of (T0, T32) is associated, when TCI code point 1 is indicated, the UE may determine that a pair of (T1, T33) is associated, . . . , when TCI code point 16 is indicated, the UE may determine that a pair of (T16, T48) is associated, and determine that beamforming is to be performed at the first TRP and the second TPRP.

FIG. 15B illustrates a structure of a MAC CE message for C-JT/NC-JT transmission according to another embodiment of the disclosure.

In the present embodiment of the disclosure, it is assumed that two TRPs are configured for C-JT/NC-JT transmission, a total of 128 TCI states are configured, and N TCI Code IDs (e.g., N=16) are configured, as in the embodiment of FIG. 15A.

Instead of the embodiment of FIG. 15A in which resources of N that is the number of TCI code IDs, e.g., TCI states ID 1 of the first TRP, TCI states ID 2 of the first TRP, . . . , TCI states ID N of the first TRP are omitted, in the present embodiment of the disclosure, TCI states for a first TRP may be first arrayed in Oct 2 to Oct N resources in a MAC CE message, and then TCI states for a second TRP may be arrayed. That is, in Oct 2 to Oct (N+1)/2 resources, TCI states ID for the first TRP and TCI states ID for the second TRP may be associated as a pair according to an order of activation of TCI states for the first TRP. In the embodiment of the disclosure, TCI states T0 to T(N−2)×8+7 are separately indicated according to TRPs, such that TCI states IDs for the first TRP are skipped and thus resource efficiency may be achieved. For example, in a case where the UE receives a MAC CE message where IDs are separately indicates in a manner that BWP ID is 00, Serving Cell ID is 00100, TCI states activated for the first TRP are T0 to T7 (T0=T1=T2=T3=T4=T5=T6=T7=1), TCI states activated for the second TRP are T24 to T31 (T24=T25=T26=T27=T28=T29=T30=T31=1), TCI states ID 1 of the second TRP is 0010000, TCI states ID 1 of the second TRP is 0010000, TCI states ID 2 of the second TRP is 0010-001, . . . , TCI states ID 16 of the second TRP is 0011000, when TCI code point 0 is indicated, the UE may determine that a pair of (TO, T32) is associated, when TCI code point 1 is indicated, the UE may determine that a pair of (T1, T33) is associated, . . . , when TCI code point 16 is indicated, the UE may determine that a pair of (T16, T48) is associated, and determine that beamforming is to be performed at the first TRP and the second TPRP.

In another embodiment of the disclosure, when the MAC CE message of FIG. 13 and the MAC CE message of FIG. 15A or FIG. 15B are configured as two separate MAC CE messages, serving cell ID and BWP ID may be located at the front (Oct 1) of FIG. 15A or FIG. 15B, and Oct N+1 to Oct N+32 of FIG. 15 may be arrayed to configure a message separate from FIG. 13. When serving cell ID and BWP ID, and a MAC CE message are configured as separate messages, the BS may separate configuration of TCI states and beam configuration for C-JT/NC-JT for the UE, such that flexibility in changing a beamforming pair (first/second TRP state ID N) may be increased.

In the present embodiment of the disclosure, a case where two TRPs for C-JT/NC-JT are used is described, but, when the number of TRPs is increased to Y, an additional resource for TCI state ID1 for TRP 2, TCI state ID2 for TRP 3, . . . , TCI state ID(N−1) for TRP Y is additionally required, and may be easily derived based on the embodiment of the disclosure.

The disclosure provides additional and efficient type and length of DCI information for C-JT/NC-JT based on the aforementioned RRC information and MAC CE message. For example, a NR Rel-16 specification-based TCI field size in a PDCCH may be configured of N bits being different from a NR Rel-15 specification-based TCI field size. A configuration method based on two sizes may be divided to two ways.

1-1 Embodiment

NR Rel-16 specification-based TCI in a PDCCH may be newly provided to perform PDSCH transmission based on C-JT/NC-JT at two or more different transmission points. A TCI field in DCI transmitted by the BS may be determined as 3×K bits according to the number (K) of TCI states configuring C-JT/NC-JT. 3×K bits is a value obtained by equally applying 3 bits to a NR Rel-15 specification-based TCI field size. 3-bit field for a NR Rel-15 specification UE and 3-bit field for C-JT/NC-JT field for a NR Rel-16 specification UE may be separate, and each 3-bit field is configured of 3 bits. For example, in 3×K bits, the 3-bit field based on NR Rel-15 specification may be located at the front, and the 3-bit field based on NR Rel-16 specification for C-JT/NC-JT may be located at the rear. The 3-bit field based on NR Rel-15 specification located at the front may include all TCI states that are activated in response to NR Rel-15 specification MAC CE. A TCI states group (6 bits) including TCI states that are activated in response to NR Rel-16 specification MAC CE may include all of the TCI states activated in response to NR Rel-15 specification MAC CE. That is, the NR Rel-16 specification UE for which C-JT/NC-JT are scheduled may check a 3-bit field for the first TRP and a separate 3-bit field for the second TRP and thus may perform beamforming changing or beamforming switching.

In this regard, the number of all TCI states activated in response to NR Rel-15 specification MAC CE and NR Rel-16 specification MAC CE may be configured by the BS, may be determined as a preset value, or may be determined as a value reported via UE capability. The number of all TCI states activated in response to NR Rel-15 specification MAC CE and NR Rel-16 specification MAC CE has to be configured to be equal to or smaller than a configured or determined value.

For example, UE capability parameter tci-StatePDSCH defines TCI states to transmit a PDSCH in FR1, and the number of TCI states may be configured to be 4, 8, 16, 32, 64, and 128 in FR1, and 64 and 128 in FR2. Maximum 8 states that can be indicated by 3 bits of a TCI field of DCI may be configured based on the configured number via a MAC CE message. A largest value of 128 corresponds to a value indicated by maxNumberConfiguredTCIstatesPerCC in a tci-StatePDSCH parameter included in UE capability signaling. The number of maxNumberConfigured-TCIstatesPerCC in C-JT/NC-JT transmission at a single TRP or multiple TRPs may be increased in proportion to the number of C-JT/NC-JT supported by the UE. For example, in a case where the UE performs transmission or reception based on C-JT/NC-JT at two TRPs, it may be determined that the maximum number of TCI-States of the first TRP is 64 and the maximum number of TCI-States of the second TRP is 64, such that maxNumberConfigured-TCIstates-PerCC may be determined to be 64 or 128. As another example, in a case where the UE performs transmission or reception based on C-JT/NC-JT at two TRPs, it may be determined that the maximum number of TCI-States of the first TRP is 64 or 128, and the maximum number of TCI-States of the second TRP is 64 or 128, such that maxNumberConfigured-TCIstatesPerCC may be determined to be 128 or 256.

That is, in the embodiment of the disclosure, in 6 bits of DCI of the NR Rel-16 specification UE so as to schedule a PDSCH based on C-JT/NC-JT, a 3-bit field located at the front may be used to select at least one of 8 states selected by a MAC CE from among maximum 64 or 128 TCI states of the first TRP, and a 3-bit field located at the rear may be used to select at least one of 8 states selected by the MAC CE from among maximum 64 TCI states of the second TRP.

1-2 Embodiment

According to an embodiment of the disclosure, PDSCH transmission based on C-JT/NC-JT at two or more different transmission points may be performed via a NR Rel-16 specification-based TCI field in a PDCCH. A TCI field in DCI transmitted from a TRP or the BS to the UE may be determined as 4 bits according to the number (K) of TCI states configuring C-JT/NC-JT. In the present embodiment of the disclosure, 8 TCI states indicated by each of the first TRP and the second TRP are integrated and mapped to code points, such that one 4-bit field can indicate 16 TCI states. Code points indicating 0000 to 0111 indicates a beamforming direction for a PDSCH indicated by TRP1 of the BS. Code points indicating 1000 to 1111 may solely indicate a beamforming direction for a PDSCH indicated by TRP2 of the BS or may collectively indicate a set of beamforming directions indicated by TRP1 and TRP2.

For example, in Table 15-1, Code points of 1000 to 1111 may be mapped to two or more TCI states or TCI state groups. In detail, in Table 15-1, 8 TCI states pairs indicated by the first TRP and the second TRP are selected and each of the selection is mapped. The BS may set indexing of a beamforming direction associated with DL RS is K1 at the first TRP and indexing of a beamforming direction associated with DL RS is K1' at the second TRP, and may configure them as one pair of (K1, K1'). For example, the BS may indicate TCI states by mapping a pair of TCI states (K1, K1') to TCI code point 1000.

The selected 8 TCI states pairs may be configured and updated in a DL MAC CE message transmitted from the BS to the UE. In order to generate TCI states pairs below, the BS may first set combinations of beams for C-JT/NC-JT transmission and may assume that messages as in 1-1 Embodiment, 1-2 Embodiment, 2-1 Embodiment, or 2-2 Embodiment about a MAC CE are transferred to the UE. The UE may receive the MAC CE and then may perform C-JT/NC-JT transmission or reception by using at least some code points in DCI. In this regard, the BS may efficiently design a bit width by assuming that beam directions of K1 and K1', and K2 and K2' are different from each other. However, the disclosure does not exclude a case where a beam direction of K1 and a beam direction of K1' are equal to each other.

TABLE 15-1

| TCI code point | TCI states |
| --- | --- |
| 0000 | K1 from TRP-1 |
| 0001 | K2 from TRP-1 |
| 0010 | K3 from TRP-1 |
| 0011 | K4 from TRP-1 |
| 0100 | K5 from TRP-1 |
| 0101 | K6 from TRP-1 |
| 0110 | K7 from TRP-1 |
| 0111 | K8 from TRP-1 |
| 1000 | K1 from TRP-1 and K1' from TRP-2 |
| 1001 | K2 from TRP-1 and K2' from TRP-2 |
| 1010 | K3 from TRP-1 and K3' from TRP-2 |
| 1011 | K4 from TRP-1 and K4' from TRP-2 |
| 1100 | K5 from TRP-1 and K5' from TRP-2 |
| 1101 | K6 from TRP-1 and K6' from TRP-2 |

TABLE 15-1-continued

| TCI code point | TCI states |
| --- | --- |
| 1110 | K7 from TRP-1 and K7' from TRP-2 |
| 1111 | K8 from TRP-1 and K8' from TRP-2 |

In another example, as in Table 15-2, code points indicating 0000 to 0111 indicates a beamforming direction for a PDSCH indicated by TRP1 of the BS. Code points indicating 1000 to 1111 may indicate a beamforming direction for a PDSCH indicated by TRP2 of the BS. However, when a TCI field is configured of 4 bits as in the present embodiment of the disclosure, there may be a limit with which TRP1 and TRP2 cannot be simultaneously indicated at one time. Therefore, the present embodiment of the disclosure may be used in association with a case where beam directions are sequentially changed or a MAC CE proposal in which a PDCCH beamforming direction is updated by using a method to be described below in 3-1 Embodiment or 3-2 Embodiment. The MAC CE proposal in which a PDCCH beamforming direction is updated will be described below with reference to 3-1 Embodiment or 3-2 Embodiment.

TABLE 15-2

| TCI code point | TCI states |
| --- | --- |
| 0000 | K1 from TRP-1 |
| 0001 | K2 from TRP-1 |
| 0010 | K3 from TRP-1 |
| 0011 | K4 from TRP-1 |
| 0100 | K5 from TRP-1 |
| 0101 | K6 from TRP-1 |
| 0110 | K7 from TRP-1 |
| 0111 | K8 from TRP-1 |
| 1000 | K1' from TRP-2 |
| 1001 | K2' from TRP-2 |
| 1010 | K3' from TRP-2 |
| 1011 | K4' from TRP-2 |
| 1100 | K5' from TRP-2 |
| 1101 | K6' from TRP-2 |
| 1110 | K7' from TRP-2 |
| 1111 | K8' from TRP-2 |

TCI states tables indicated in Tables 15-1 and 15-2 may be defined in assumption that codeword (TB) transmitted from the BS to the UE has been already considered.

For example, codeword may have been already configured according to the number of antenna ports. That is, as in Tables 15-1 and 15-2, the number of codeword to be transmitted may have been already configured in DMRS Table indicating the number of antenna ports, and the pre-configured number of codeword may be 1.

As another example, codeword indicated in code points of 0000 to 0111 may essentially indicate TB #1, and code points of 1000 to 1111 may indicate TB #2. Existence or non-existence of TB #1 and TB #2 may be determined based on whether each of MCS, NDI, and RV fields is present in DCI format 1_1. In detail, in a case where DCI format 1_1 supports only one TB #1 and thus MCS, NDI, and RV fields are allocated 5 bits, 1 bit, and 2 bits, respectively, the UE may determine that a TCI field is entirely related to TB #1. On the other hand, in a case where DCI format 11 supports TB #1 and TB #2 and thus 2 sets of MCS, NDI, and RV fields are allocated 5 bits, 1 bit, and 2 bits, respectively, TCI code point for TB #1 may be indicated as 0000 to 0111, and TCI code point for TB #2 may be indicated as 1000 to 1111.

In another example, a NR Rel-16 specification-based TCI field size in a PDCCH may be configured of 3 bits equal to a NR Rel-15 specification-based TCI field size. However, code points of a 3-bit TCI field based on NR Rel-16 specification may be variously interpreted.

2-1 Embodiment

According to an embodiment of the disclosure, one code point may be mapped to two or more TCI states or TCI state groups. In Table 16, 8 TCI states pairs indicated by the first TRP and the second TRP are selected and each of the selection is mapped. The BS may set indexing of a beam-forming direction associated with DL RS is K1 at the first TRP and indexing of a beamforming direction associated with DL RS is M1 at the second TRP, and may configure them as one pair of (K1, M1). For example, the BS may indicate TCI states by mapping a pair of TCI states (K1, M1) to TCI code point 000.

The selected 8 TCI states pairs may be configured and updated in a DL MAC CE message transmitted from the BS to the UE. In order to generate TCI states pairs as in Table 16, the BS may set combinations of beams for C-JT/NC-JT transmission, and may transmit a MAC CE message to configure the combinations for the UE.

TABLE 16

| TCI code point | TCI states |
|---|---|
| 000 | K1 from TRP-1, M1 from TRP-2 |
| 001 | K2 from TRP-1, M2 from TRP-2 |
| 010 | K3 from TRP-1, M3 from TRP-2 |
| 011 | K4 from TRP-1, M4 from TRP-2 |
| 100 | K5 from TRP-1, M5 from TRP-2 |
| 101 | K6 from TRP-1, M6 from TRP-2 |
| 110 | K7 from TRP-1, M7 from TRP-2 |
| 111 | K8 from TRP-1, M8 from TRP-2 |

Hereinafter, a method by which the BS updates TCI states via UE-specific PDCCH MAC CE to the UE will now be described.

3-1 Embodiment

Figure 16A:
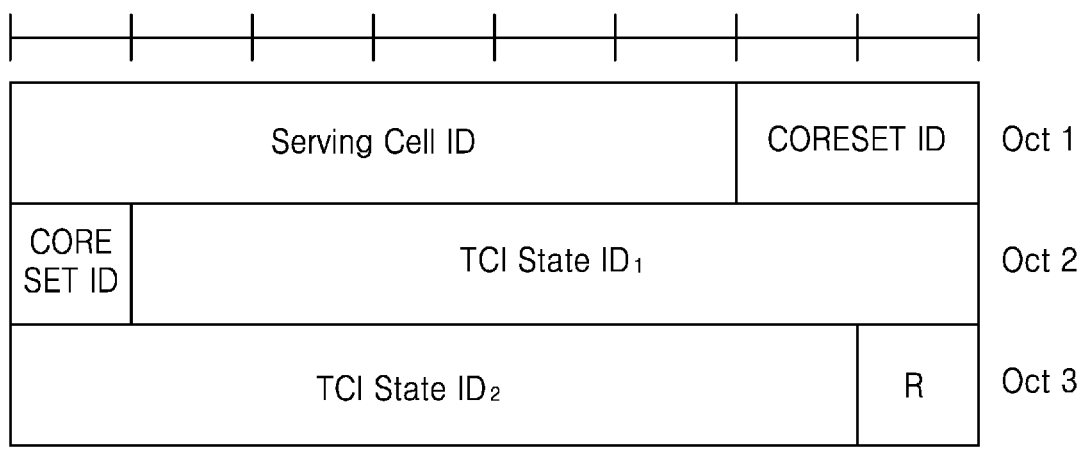
FIG. 16A illustrates a method by which a base station (BS) updates a physical downlink control channel (PDCCH) beam for C-JT/NC-JT transmission to the UE according to an embodiment of the disclosure.

FIG. 16A illustrates a method by which the BS updates a PDCCH beam for C-JT/NC-JT transmission to the UE according to an embodiment of the disclosure. For example, the BS may change and update the PDCCH beam, on condition of PDSCH transmission based on C-JT/NC-JT. A message for updating TCI state indication via UE-specific PDCCH MAC CE may be added Oct3 resource for TCI state ID 2, in addition to serving cell ID, CORESET ID, and TCI state ID 1. When the UE receives the message for updating TCI state indication, the UE may determine that a change in a beam for a PDCCH supports not only a direction of TCI state ID 1 but also simultaneously supports a direction of TCI state ID 2. TCI states ID 1 and 2 may correspond to a case where two TCI states are selected from among activated TCI states configured in FIG. 11. TCI state ID 1 may be a beam allocated from the BS to the UE for main usage and may indicate a primary beam, a beam indicated by a lowest TCI index, or a frequently-scheduled beam. TCI state ID 2 may be a beam allocated from the BS to the UE for subsidiary usage and may indicate a secondary beam, a beam indicated by a highest TCI index, or an intermittently-scheduled beam. TCI state ID 2 may be used in a PDCCH beam transmitted for the purpose of PDCCH beam sweeping or repetition.

Four BWPs may be present in one serving cell, and maximum 3 CORESETs may be configured in one BWP, such that the maximum number of NR Rel-15 specification CORESET IDs may be 12. When the number of CORESETs which is maximally configurable in one BWP is increased to 4 for C-JT/NC-JT transmission, additional bit(s) may be required. TCI state ID 2 for changing and updating a PDCCH beam may be used to directly change and update the PDCCH beam, or may be continuously used to update a direction of PDSCH beamforming thereafter.

3-2 Embodiment

In another example, TCI state ID 2 may not be directly used in changing and updating of a PDCCH beam, but instead, the PDCCH beam may be first changed by using TCI state ID 1 and then TCI state ID 2 may be used to change and update a PDSCH beam thereafter. That is, TCI state ID 2 may be configured as spare to be used for a PDSCH at a later time. In detail, when CORESET ID is configured of 4 bits, 4-bit indices (e.g., 1011, 1101, 1110, 1111) indicating 11 to 15 are not used in NR Rel-15 specification. The BS may additionally configure and indicate TCI state ID 2 for C-JT/NC-JT to the UE by using the indices of 1011 to 1111. As in the embodiment of the disclosure, when the UE receives a MAC CE message for performing change and update of a PDCCH beam, the UE may receive DCI 1_0 or 1_1 for C-JT/NC-JT transmission. In this regard, when the UE identifies an indicator for joint transmission in an antenna port field in the received DCI information, the UE may determine that a PDSCH is to be jointly transmitted by using TCI state ID 1 and TCI state ID 2, unless a separate TCI state MAC CE update occurs.

Alternatively, as in 1-2 Embodiment, when the UE identifies 1000, 1001, 1010, 1011 in a TCI field in the received DCI information, the UE may determine that 1011, 1101, 1110, 1111 mean beam directions configured by TCI State ID 2 for the second TRP. In detail, in the arrayed order, four available code points in a 4-bit field of CORESET ID are sequentially indicated in the TCI field in DCI, and when a CORESET field is increased to 5 bits, the number of available code points is increased, and thus, code points may be mapped to more TCI states fields.

Fourth Embodiment

A present embodiment of the disclosure provides an interpretation method for the UE with respect to various TCI state activation MAC CE formats according to various NC-JT support modes, and TCI assumption apply methods therefor.

As described above, the BS may support joint transmission by using at least one of two methods that are 1) NC-JT via multiple PDCCHs (multi-DCI based multi-TRP operation, mDCI based mTRP) and 2) NC-JT via one PDCCH (single-DCI based multi-TRP operation, sDCI based mTRP). The UE reports, to the BS, UE capability about whether or not the UE supports the two methods, and in response to the UE capability report, the BS may configure, via RRC and MAC CE, the UE with information about which joint transmission or a combination thereof is to be used.

For example, in order for the BS to notify the UE of NC-JT via multiple PDCCHs (multi-DCI based multi-TRP operation, mDCI based mTRP), the BS may configure higher layer parameter per CORESET (CORESETPoolIndex) for separating CORESET to two or more groups (CORESET groups or CORESET pools), the CORESET being configured in one serving cell or a BWP. When BWPs configured to have different CORESETPoolIndex values are present in a certain serving cell or a BWP (i.e., when a certain BWP is configured as CORESETPoolIndex=0, and another BWP is configured as CORESETPoolIndex=1, in a case where the certain BWP is not configured a CORESETPoolIndex value, the certain BWP may be regarded to have been configured as CORESETPoolIndex=0), the UE may determine that joint transmission by multiple TRPs or panels may be performed in the serving cell or the BWP. A method of determining whether joint transmission is to be performed, the method being based on CORESETPoolIndex configuration values, may be extended by using various methods including a method of configuring higher layer parameter per PUCCH for separating a PUCCH resource to two or more groups (PUCCH groups), the PUCCH resource being configured in one serving cell or a BWP, or a method of defining and configuring another independent higher layer parameter, but detailed descriptions thereof are not provided here not to obscure the essence of the disclosure.

In order to support NC-JT via multiple PDCCHs (multi-DCI based multi-TRP operation, mDCI based mTRP), the BS may notify, via a MAC CE, the UE of TCI activation information that is independent in each of TRPs (or in each of panels or each of CORESET pools).

FIG. 16B illustrates a structure of a TCI activation MAC CE message for NC-JT via multiple PDCCHs (multi-DCI based multi-TRP operation, mDCI based mTRP).

Figure 16A:
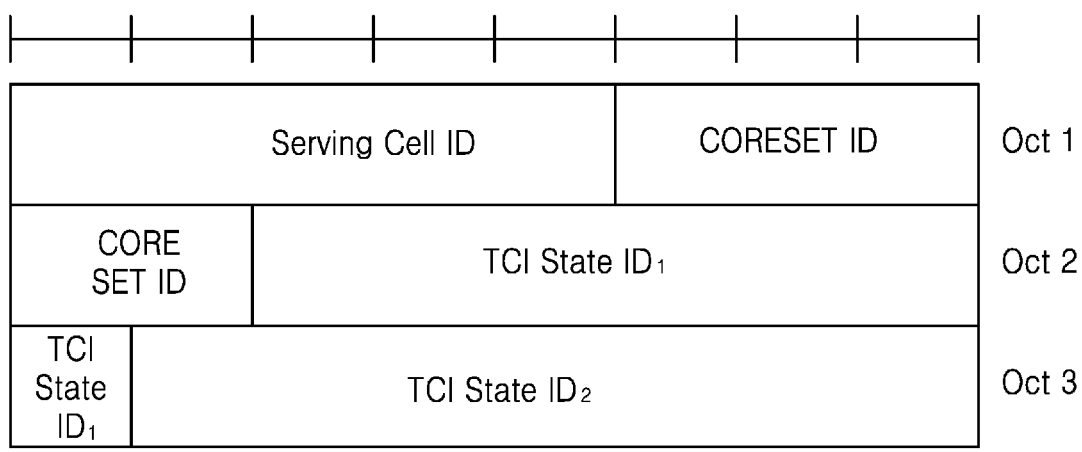

Referring to FIG. 16B, the TCI activation MAC CE message for NC-JT via multiple PDCCHs (multi-DCI based multi-TRP operation, mDCI based mTRP) may include information (CORESET Pool ID, e.g., 1 bit) indicating to which CORESET pool a PDCCH to allocate a PDSCH belongs, wherein TCI states that are to be activated in response to the MAC CE message are to be applied to the PDSCH. Also, the TCI activation MAC CE message for NC-JT via multiple PDCCHs (multi-DCI based multi-TRP operation, mDCI based mTRP) may include information about Serving Cell ID (e.g., 5 bits) and BWP ID (e.g., 2 bits) that are configured for communication between the BS and the UE. Also, the MAC CE message may require M bits to indicate activation or deactivation of each of M TCI states by using 1-bit indication. M bits may be arrayed by using resources in an Octet form as shown in FIG. 16. Indices T0, T1, ..., T(N−2)×8−7 indicate respective TCI states, and in order to indicate a total of M bits, M may be configured to be a value equal to or greater than T(N−2)×8 and equal to or smaller than T(N−2)×8−7. For example, in order to indicate TCI states to be activated from among 128 TCI states, the MAC CE message may require a total of 17 Octet(N=17) resources including Oct 1 for configured Serving Cell ID and BWP ID. In this regard, when 8 TCI states from T0 to T7 are activated, 1 may be indicated at locations corresponding to T0 to T7 resources in the MAC CE message and other T8 to T127 may be indicated as 0. The locations of the resources indicated as 1 to indicate activation of the TCI states may be mapped for the UE to determine activated directions of beamforming when the UE receives the MAC CE and then succeeds in decoding the MAC CE. In this regard, as described above, the UE may apply the activated direction of beamforming to reception of a PDSCH allocated by CORESET having CORESETPoolIndex that matches with a CORESET Pool ID value in the MAC CE. For convenience of description, a format of the MAC CE shown in FIG. 16B is called MAC CE format B in descriptions below.

In another example for configuring cooperative transmission, in order for the BS to notify the UE of NC-JT via one PDCCH (single-DCI based multi-TRP operation, sDCI based mTRP), the BS may notify, via a MAC CE, the UE of information about a plurality of TCI activation pairs with respect to multiple TRPs (or multiple panels).

FIG. 16C illustrates a structure of a TCI activation MAC CE message for NC-JT via one PDCCH (single-DCI based multi-TRP operation, sDCI based mTRP).

Referring to FIG. 16C, the TCI activation MAC CE message for NC-JT via one PDCCH (single-DCI based multi-TRP operation, sDCI based mTRP) may include information about Serving Cell ID (e.g., 5 bits) and BWP ID (e.g., 2 bits) that are configured for communication between the BS and the UE. In the MAC CE message, $C_i$ may be defined to indicate activation or deactivation of the plurality of TCI activation pairs by using TCI state ID (7 bits). $C_i$ is a 1-bit indicator indicating whether or not TCI state $ID_{i,2}$ exists, and when $C_i=1$, TCI state $ID_{i,2}$ exists. Otherwise (that is, when $C_i=0$), TCI state $ID_{i,2}$ may be omitted. In TCI state $ID_{i,j}$, i may denote an index of code point in a TCI field of DCI, j may denote an index of TCI state in the code point, and TCI state $ID_{i,j}$ may denote $j^{th}$ TCI state for $i^{th}$ TCI field. In this regard, the TCI field of the DCI may be maintained as 8 at the maximum (i.e., $0 \le i \le 7$), as in the previous standard, and the maximum number of TCI states in one code point may be equal to the maximum number of TRPs (or panels) (i.e., j=1 or 2). For convenience of description, a format of the MAC CE shown in FIG. 16C is called MAC CE format C in descriptions below.

As described above, the UE may receive at least one format from among the TCI activation MAC CE formats A, B, or C from the BS so as to receive a data signal transmitted from one TRP or multiple TRPs. As a result, according to whether two cooperative transmission modes (1. mDCI based mTRP, 2. sDCI based mTRP) are configured, and whether three MAC CE formats (TCI activation MAC CE formats A, B, or C) are received, various cases about combinations of which transmission mode is configured and which MAC CE format is received may be available. The UE may perform an operation matched to one of the cases by using at least one the methods provided in the embodiment of the disclosure.

In various cases below, Case #A-B refers to a situation where Case A occurs and B is additionally defined.

Case #1) Case #1 may be a case where the UE is configured with CORESETPoolIndex of different values with respect to two or more CORESETs in a certain serving cell or a BWP and thus is enabled for a mDCI based mTRP operation, and the UE is allocated a PDSCH from all CORESETs, regardless of CORESETPoolIndex value.

Case #1-1) In Case #1, when certain CORESET is configured with enabled upper layer parameter tci-PresentInDCI, a TCI field is present in DCI transmitted via a PDCCH in the CORESET, and an offset between the PDCCH and a PDSCH allocated by the PDCCH is larger than timeDurationForQCL reported by UE capability report, that is, when TCI state for PDSCH DMRS is determined based on indication of the DCI transmitted via the PDCCH in the CORE- SET, the TCI state for the PDSCH DMRS has to be pre-activated according to the MAC CE format A or B.

Method 1: When TCI state activation MAC CE is not received for all CORESETs configured with CORESETPoolIndex 0 and 1 in Case #1-1, that is, when the UE does not receive the MAC CE format A nor the MAC CE format B, the BS and the UE may be configured to apply QCL assumption based on SS/PBCH block according to an initial access procedure, regardless of CORESETPoolIndex value. This configuration may be interpreted in a manner that, even when mDCI based mTRP cooperative transmission is configured, a cooperative transmission operation is not performed until an appropriate MAC CE format is received.

Method 2: When TCI state activation MAC CE is not received for all CORESETs configured with CORESETPoolIndex 0 and 1 in Case #1-1, that is, when the UE does not receive the MAC CE format A nor the MAC CE format B, the BS and the UE may be configured to apply QCL assumption based on SS/PBCH block according to an initial access procedure with respect to a PDSCH allocated by CORESET that is configured with CORESETPoolIndex=0 or is not configured with CORESETPoolIndex parameter, and may be configured to apply TCI state for CORESET with CORESETPoolIndex=1 with respect to a PDSCH allocated by the CORESET with CORESETPoolIndex=1. This configuration is to make cooperative transmission available even before MAC CE signaling in a manner that, when mDCI based mTRP cooperative transmission is configured, QCL assumption based on SS/PBCH is applied to reception of the PDSCH allocated by the CORESET (i.e., CORESET with CORESETPoolIndex=0 or not configured with CORESETPoolIndex parameter) transmitted at the first TRP, and another QCL assumption different from the QCL assumption is allowed to be applied to reception of the PDSCH allocated by the CORESET (i.e., CORESET with CORESETPoolIndex=1) transmitted at the second TRP.

Method 2: In Case #1-1, when the UE receives TCI state activation MAC CE for CORESET configured with CORESETPoolIndex 0 (or 1) (i.e., when the UE receives MAC CE format A or receives MAC CE format B configured with 0 as CORESET Pool ID), but does not receive TCI state activation MAC CE for CORESET configured with CORESETPoolIndex 1 (or 0)(i.e., when the UE does not receive yet MAC CE format B configured with 1 as CORESET Pool ID), the UE may be configured to use TCI indicated by DCI when the UE receives a PDSCH allocated by CORESET (i.e., CORESET with CORESETPoolIndex=0 or not configured with CORESETPoolIndex parameter) transmitted at a first TRP, and to apply QCL assumption based on SS/PBCH block according to an initial access procedure when the UE receives a PDSCH allocated by CORESET (i.e., CORESET with CORESETPoolIndex=1) transmitted at a second TRP. The case above is interpreted that the CORESET configured with CORESETPoolIndex=0 and the CORESET configured with CORESETPoolIndex=1 are all transmitted at the first TRP, and thus, in order to decrease reception complexity of the UE, additional methods may be agreed to be applied, e.g., it may be agreed not to receive a PDSCH allocated by the CORESET configured with CORESETPoolIndex=1 (in practice, various representations may be available, e.g., in this case, the UE does not expect the CORESET configured with CORESETPoolIndex=1 to allocate a PDSCH, or in this case, the UE does not require a PDSCH to be decoded, the PDSCH being allocated by the CORESET configured with CORESETPoolIndex=1),or it may be agreed to apply new QCL assumption (e.g., 1) to follow lowest (highest) ID from among configured PDSCH DMRS TCI states or 2) to follow lowest (highest) ID from among TCI states activated according to MAC CE format A or MAC CE format B configured with CORESET Pool ID=0) based on SS/PBCH block according to an initial access procedure, instead of QCL assumption, to a PDSCH allocated by the CORESET configured with CORESETPoolIndex=1.

Method 4: in Case #1-1, when the UE receives TCI state activation MAC CE for CORESET configured with CORESETPoolIndex 0 (or 1) (i.e., when the UE receives MAC CE format A or receives MAC CE format B configured with 0 as CORESET Pool ID), but does not receive TCI state activation MAC CE for CORESET configured with CORESETPoolIndex 1 (or 0)(i.e., when the UE does not receive yet MAC CE format B configured with 1 as CORESET Pool ID), the UE may be configured to use TCI indicated by DCI when the UE receives a PDSCH allocated by CORESET (i.e., CORESET with CORESETPoolIndex=0 or not configured with CORESETPoolIndex parameter) transmitted at a first TRP, and in consideration that one of MAC CE formats for CORESET transmitted at the first TRP is already received, the UE may be configured not to apply QCL assumption based on SS/PBCH block according to an initial access procedure when the UE receives a PDSCH allocated by CORESET (i.e., CORESET with CORESETPoolIndex=1) transmitted at a second TRP. This configuration means that a QCL assumption method for the UE with respect to the PDSCH allocated by the CORESET transmitted at the second TRP is not defined, and thus, in this case, the BS cannot allocate the PDSCH via the CORESET transmitted at the second TRP. In this case, a degree of freedom with respect to scheduling by the BS deteriorates, and thus, in order to solve this issue, additional methods may be agreed to be applied, e.g., it may be agreed not to receive a PDSCH allocated by the CORESET configured with CORESETPoolIndex=1 (in practice, various representations may be available, e.g., in this case, the UE does not expect the CORESET configured with CORESETPoolIndex=1 to allocate a PDSCH, or in this case, the UE does not require a PDSCH to be decoded, the PDSCH being allocated by the CORESET configured with CORESETPoolIndex=1),or it may be agreed to apply new QCL assumption (e.g., 1) to follow lowest (highest) ID from among configured PDSCH DMRS TCI states or 2) to follow lowest (highest) ID from among TCI states activated according to MAC CE format A or MAC CE format B configured with CORESET Pool ID=0) based on SS/PBCH block according to an initial access procedure, instead of QCL assumption, to a PDSCH allocated by the CORESET configured with CORESETPoolIndex=1.

Case #1) Case #1 may be a case where the UE is configured with CORESETPoolIndex of different values with respect to two or more CORESETs in a certain serving cell or a BWP and thus is enabled for a mDCI based mTRP operation, and simultaneously, the UE receives MAC CE format C in a certain serving cell or a BWP and thus is enabled for a sDCI based mTRP operation.

Case #2-1) In Case #2, the UE may simultaneously receive MAC CE formats A and B and MAC CE format C, and thus may have to receive PDSCHs by selecting one of the mDCI based mTRP operation or the sDCI based mTRP operation.

Method 5: In NR Rel-16 specification, the UE may simultaneously receive maximum two PDSCHs. In order to ensure the maximum number of PDSCHs that can be simultaneously received in a situation like Case #2, methods below may be used. The UE may perform PDSCH reception in response to cooperative transmission to be used according to priorities of the mDCI based mTRP operation and the sDCI based mTRP operation. For example, when the sDCI based mTRP operation is indicated in priority over the mDCI based mTRP operation, the UE may be guaranteed not to perform the mDCI based mTRP. This configuration means that, in a case where the UE receives MAC CE format C for certain CORESET, when a TCI field in DCI transmitted in the certain CORESET indicates two TCI states and code points mapped thereto, the UE performs PDSCH reception based on the sDCI based mTRP operation and does not require the mDCI based mTRP operation, i.e., CORESET having CORESETPoolIndex value different from CORESETPoolIndex of CORESET that transmitted the scheduling DCI may not additionally allocate a PDSCH at the PDSCH reception by the UE.

Method 6: In NR Rel-16 specification, the UE may simultaneously receive maximum two PDSCHs. In order to ensure the maximum number of PDSCHs that can be simultaneously received in a situation like Case #2, methods below may be used. The UE may perform PDSCH reception in response to cooperative transmission to be used according to priorities of the mDCI based mTRP operation and the sDCI based mTRP operation. For example, when the mDCI based mTRP operation is indicated in priority over the sDCI based mTRP operation, the UE may be guaranteed not to perform the sDCI based mTRP operation. This configuration means that, in a case where the UE is allocated two PDSCHs in a same time resource based on DCIs transmitted by CORESETs having different CORESETPoolIndex values, when one of the DCIs indicates two TCI states and code points mapped thereto, the UE has to use TCI state having lowest TCI ID (or TCI state $ID_{i,1}$ in FIG. 16C) from among the two TCI states so as to receive a PDSCH allocated based on the DCI.

In order to clearly indicate which CORESETPoolIndex is associated with MAC CE format C in Methods 5 and 6, reserved bit (R) configured of 1 bit in first Oct of FIG. 16C may be changed to a bit to indicate CORESET Pool ID in a similar manner to the example of FIG. 16B. In this case, TCI states to be activated based on MAC CE format C may be applied to only a PDSCH allocated based on DCIs transmitted by CORESETs having CORESETPoolIndex=0 value when CORESET Pool ID of the MAC CE format C is 0. When CORESET Pool ID of the MAC CE format C is 1, the TCI states may be applied to only a PDSCH allocated based on DCIs transmitted by CORESETs having CORESETPoolIndex=1 value.

Method 7: In order for the BS to reduce complexity of the UE in managing activated TCI states in Case #2-1, the BS may allow a group of TCI states (the activated TCI states group 1) activated based on MAC CE formats A and B to include a group of TCI states (the activated TCI states group 2) activated based on MAC CE format C. By doing so, the UE may be guaranteed that, even when the mDCI based mTRP operation and the sDCI based mTRP operation are simultaneously configured, maximum complexity of management of TCI states is not greater than complexity of management of TCI states associated with mDCI based mTRP.

Method 8. In order for the BS to reduce complexity of the UE in managing activated TCI states in Case #2-1, the BS may allow a group of TCI states (the activated TCI states group 2) activated based on MAC CE format C to include a group of TCI states (the activated TCI states group 1) activated based on MAC CE formats A and B. By doing so, the UE may be guaranteed that, even when the mDCI based mTRP operation and the sDCI based mTRP operation are simultaneously configured, maximum complexity of management of TCI states is not greater than complexity of management of TCI states associated with sDCI based mTRP.

Figure 17:
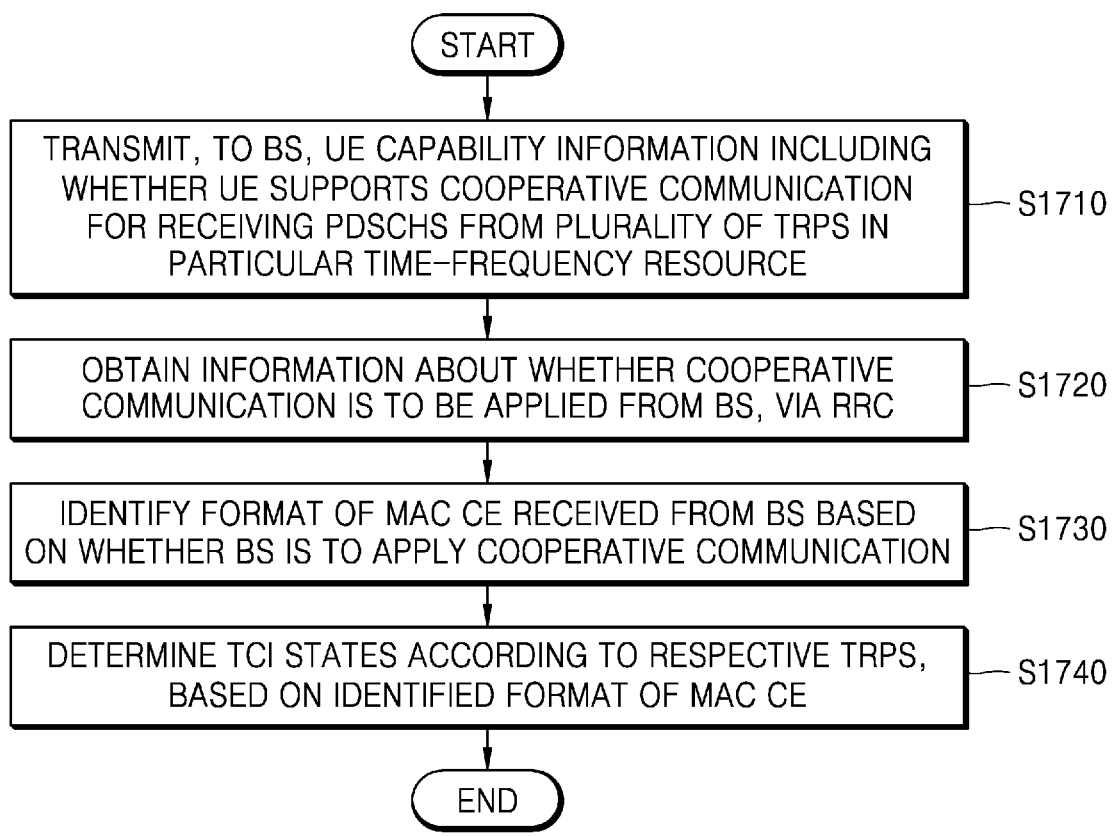
FIG. 17 illustrates a flowchart of a UE operation according to an embodiment of the disclosure.

FIG. 17 illustrates a flowchart of a UE operations according to an embodiment of the disclosure.

In operation S1710, the UE may transmit, to the BS, UE capability information including whether the UE supports cooperative communication for receiving PDSCHs from a plurality of TRPs in a particular time-frequency resource.

In operation S1720, because the UE supports the cooperative communication, the UE may obtain information about whether the cooperative communication is to be applied from the BS, via RRC.

In operation S1730, the UE may identify a format of a MAC CE received from the BS based on whether the BS is to apply the cooperative communication. In this regard, the format of the MAC CE may correspond to the descriptions provided above with reference to FIGS. 12 to 16C.

In operation S1740, the UE may determine TCI states according to the respective TRPs, based on the identified format of the MAC CE. For example, when the UE supports the cooperative communication, the UE may determine TCI states to be activated at the respective TRPs. Also, the UE may determine TCI states corresponding to the respective TRPs, based on DCI received from the BS.

Figure 18:
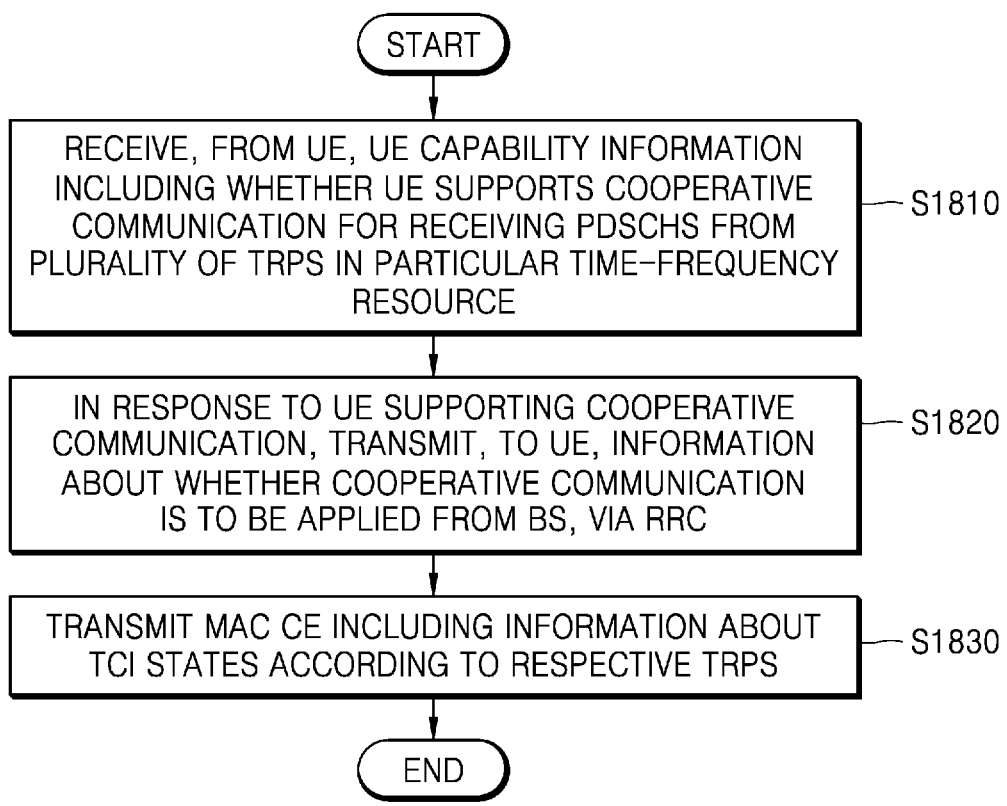
FIG. 18 illustrates a flowchart of a BS operation according to an embodiment of the disclosure.

FIG. 18 illustrates a flowchart of a base station operations according to an embodiment of the disclosure.

In operation S1810, the BS may receive, from the UE, UE capability information including whether the UE supports cooperative communication for receiving PDSCHs from a plurality of TRPs in a particular time-frequency resource.

In operation S1820, because the UE supports the cooperative communication, the BS may transmit, to the UE, information about whether the cooperative communication is to be applied from the BS, via RRC.

In operation S1830, the BS may transmit a MAC CE including information about TCI states to be activated according to respective TRPs.

Figure 19:
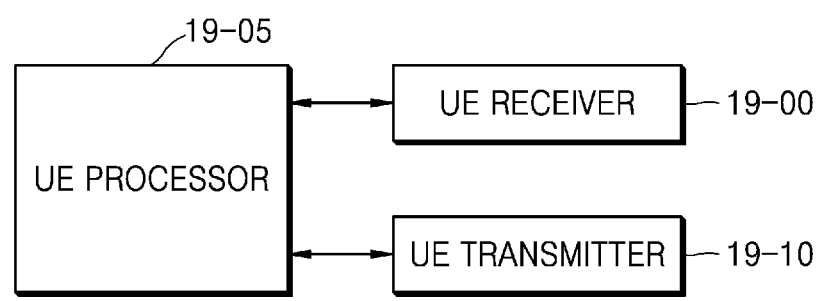
FIG. 19 illustrates a structure of a UE according to some embodiments of the disclosure.

FIG. 19 illustrates a structure of a UE according to some embodiments of the disclosure.

Referring to FIG. 19, the UE may include a UE receiver 19-00, a UE transmitter 19-10, and a UE processor 19-05. The UE receiver 19-00 and the UE transmitter 19-10 may be collectively called the transceiver. According to the aforementioned communication method performed by the UE, the UE receiver 19-00, the UE transmitter 19-10, and the UE processor 19-05 of the UE may operate. However, elements of the UE are not limited thereto. For example, the UE may include more elements (e.g., a memory) than the aforementioned elements or may include fewer elements than the aforementioned elements. Also, the UE receiver 19-00, the UE transmitter 19-10, and the UE processor 19-05 may be integrated to one chip.

The UE receiver 19-00 and the UE transmitter 19-10 (or the transceiver) may transmit and receive a signal with a BS. The signal may include control information and data. To this end, the transceiver may include a radio frequency (RF) transmitter for up-converting a frequency of and amplifying a signal to be transmitted, and an RF receiver for low-noise amplifying and down-converting a frequency of a received signal. However, the RF transmitter and the RF receiver are merely examples and the elements of the transceiver are not limited thereto.

The transceiver may receive a signal through a radio channel and output the signal to the UE processor 19-05, and may transmit a signal output from the UE processor 19-05, through a radio channel.

A memory (not shown) may store programs and data that are required for operations of the UE. The memory may also store control information or data included in a signal obtained by the UE. The memory may be implemented as a storage medium including a read only memory (ROM), a random access memory (RAM), a hard disk, a compact disc (CD)-ROM, a digital versatile disc (DVD), or the like, or any combination thereof.

The UE processor 19-05 may control a series of procedures to operate the UE according to the afore-described embodiments of the disclosure. The UE processor 19-05 may be implemented as a controller or one or more processors.

Figure 20:
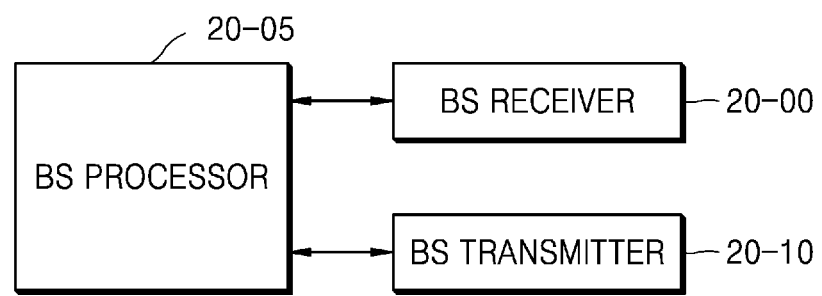
FIG. 20 illustrates a structure of a BS according to some embodiments of the disclosure.

FIG. 20 illustrates a structure of a BS according to some embodiments of the disclosure.

Referring to FIG. 20, the BS may include a BS receiver 20-00, a BS transmitter 20-10, and a BS processor 20-05. The BS receiver 20-00 and the BS transmitter 20-10 may be collectively called the transceiver. According to the afore-mentioned communication method performed by the BS, the BS receiver 20-00, the BS transmitter 20-10, and the BS processor 20-05 of the BS may operate. However, elements of the BS are not limited thereto. For example, the BS may include more elements (e.g., a memory) than the aforementioned elements or may include fewer elements than the aforementioned elements. Also, the BS receiver 20-00, the BS transmitter 20-10, and the BS processor 20-05 may be integrated to one chip.

The BS receiver 20-00 and the BS transmitter 20-10 (or the transceiver) may transmit and receive a signal with a UE. The signal may include control information and data. To this end, the transceiver may include a RF transmitter for up-converting a frequency of and amplifying a signal to be transmitted, and an RF receiver for low-noise amplifying and down-converting a frequency of a received signal. However, the RF transmitter and the RF receiver are merely examples and the elements of the transceiver are not limited thereto.

The transceiver may receive a signal through a radio channel and output the signal to the BS processor 20-05, and may transmit a signal output from the BS processor 20-05, through a radio channel.

A memory (not shown) may store programs and data that are required for operations of the BS. The memory may also store control information or data included in a signal obtained by the BS. The memory may be implemented as a storage medium including a ROM, a RAM, a hard disk, a CD-ROM, a DVD, or the like, or any combination thereof.

The BS processor 20-05 may control a series of procedures to operate the BS according to the afore-described embodiments of the disclosure. The BS processor 20-05 may be implemented as a controller or one or more processors.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) in a wireless communication system, the method comprising:
   receiving, from a base station (BS), radio resource control (RRC) information configuring a plurality of transmission configuration indicator (TCI) states for a physical downlink control channel (PDCCH);
   receiving, from the base station, a medium access control (MAC) control element (CE) indicating two TCI states, among the plurality of TCI states, for PDCCH reception for a control resource set (CORESET) of a serving cell; and
   receiving, from the base station, the PDCCH using the two TCI states based on the MAC CE,
   wherein the PDCCH, transmitted using the two TCI states, carries same downlink control information (DCI).

2. The method of claim 1, wherein the MAC CE has 3 octets comprising:
   a serving cell identifier field indicating the serving cell for which the MAC CE applies,
   a CORESET identifier field indicating the CORESET for which the two TCI states are being indicated, and
   TCI states identifier fields respectively indicating the two TCI states applicable to the CORESET identified by the CORESET identifier field.

3. The method of claim 2, wherein a length of each of the TCI states identifier fields is 7 bits.

4. The method of claim 2, wherein a length of the serving cell identifier field is 5 bits and a length of the CORESET identifier field is 4 bits.

5. A method of a base station (BS) in a wireless communication system, the method comprising:
   transmitting, to a user equipment (UE), radio resource control (RRC) information configuring a plurality of transmission configuration indicator (TCI) states for a physical downlink control channel (PDCCH);
   transmitting, to the UE, a medium access control (MAC) control element (CE) indicating two TCI states, among the plurality of TCI states, for PDCCH reception for a control resource set (CORESET) of a serving cell; and
   transmitting, to the UE, the PDCCH using the two TCI states based on the MAC CE,
   wherein the PDCCH, transmitted using the two TCI states, carries same downlink control information (DCI).

6. The method of claim 5, wherein the MAC CE has 3 octets comprising:
   a serving cell identifier field indicating the serving cell for which the MAC CE applies,
   a CORESET identifier field indicating the CORESET for which the two TCI states are being indicated, and
   TCI states identifier fields respectively indicating the two TCI states applicable to the CORESET identified by the CORESET identifier field.

7. The method of claim 6, wherein a length of each of the TCI states identifier fields is 7 bits.

8. The method of claim 6, wherein a length of the serving cell identifier field is 5 bits and a length of the CORESET identifier field is 4 bits.

9. A user equipment (UE) in a wireless communication system, the UE comprising:
   a transceiver; and
   a processor configured to:
   receive, from a base station (BS) via the transceiver, radio resource control (RRC) information configuring a plurality of transmission configuration indicator (TCI) states for a physical downlink control channel (PDCCH),
   receive, from the base station via the transceiver, a medium access control (MAC) control element (CE) indicating two TCI states, among the plurality of TCI states, for PDCCH reception for a control resource set (CORESET) of a serving cell, and receive, from the base station the transceiver, the PDCCH using the two TCI states based on the MAC CE, wherein the PDCCH, transmitted using the two TCI states, carries same downlink control information (DCI).

10. The UE of claim 9, wherein the MAC CE has 3 octets comprising:
   a serving cell identifier field indicating the serving cell for which the MAC CE applies,
   a CORESET identifier field indicating the CORESET for which the two TCI states are being indicated, and
   TCI states identifier fields respectively indicating the two TCI states applicable to the CORESET identified by the CORESET identifier field.

11. The UE of claim 10, wherein a length of each of the TCI states identifier fields is 7 bits.

12. The UE of claim 10, wherein a length of the serving cell identifier field is 5 bits and a length of the CORESET identifier field is 4 bits.

13. A base station (BS) in a wireless communication system, the base station comprising:
   a transceiver; and
   a processor configured to:
   transmit, to a user equipment (UE) via the transceiver, radio resource control (RRC) information configuring a plurality of transmission configuration indicator (TCI) states for a physical downlink control channel (PDCCH), transmit, to the UE via the transceiver, a medium access control (MAC) control element (CE) indicating two TCI states, among the plurality of TCI states, for PDCCH reception for a control resource set (CORESET) of a serving cell, and transmit, to the UE via the transceiver, the PDCCH using the two TCI states based on the MAC CE, wherein the PDCCH, transmitted using the two TCI states, carries same downlink control information (DCI).

14. The base station of claim 13, wherein the MAC CE has 3 octets comprising:
   a serving cell identifier field indicating the serving cell for which the MAC CE applies,
   a CORESET identifier field indicating the CORESET for which the two TCI states are being indicated, and
   TCI states identifier fields respectively indicating the two TCI states applicable to the CORESET identified by the CORESET identifier field.

15. The base station of claim 14, wherein a length of each of the TCI states identifier fields is 7 bits.

16. The base station of claim 14, wherein a length of the serving cell identifier field is 5 bits and a length of the CORESET identifier field is 4 bits.

* * * * *